(12) United States Patent  
Oshiro et al.

(10) Patent No.: US 8,184,920 B2  
(45) Date of Patent: *May 22, 2012

(54) MICROSCOPE SYSTEM

(75) Inventors: Masafumi Oshiro, Hamamatsu (JP);  
Koji Ichie, Hamamatsu (JP)

(73) Assignee: Hamamatsu Photonics K.K.,  
Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,673

(22) Filed: Aug. 22, 2011

(65) Prior Publication Data

US 2011/0298914 A1 Dec. 8, 2011

Related U.S. Application Data

(63) Continuation of application No. 12/873,446, filed on Sep. 1, 2010, now Pat. No. 8,027,548, which is a continuation of application No. 10/968,261, filed on Oct. 20, 2004, now Pat. No. 7,813,579.

(30) Foreign Application Priority Data

May 24, 2004 (JP) ................................ P2004-153871

(51) Int. Cl.  
*H04N 7/18* (2006.01)

(52) U.S. Cl. ...... 382/255; 382/100; 348/79; 348/E7.085
(58) Field of Classification Search .................. 382/100, 382/255; 713/186  
See application file for complete search history.

(56) References Cited

U.S. PATENT DOCUMENTS

| | | | | |
|---|---|---|---|---|
| 5,235,375 | A * | 8/1993 | Yamana et al. | 396/101 |
| 5,886,813 | A * | 3/1999 | Nagasawa | 359/383 |
| 6,362,852 | B2 * | 3/2002 | Ito | 348/345 |
| 6,552,748 | B1 * | 4/2003 | Sugimoto | 348/354 |
| 6,822,801 | B2 * | 11/2004 | Yahagi et al. | 359/634 |
| 7,232,980 | B2 | 6/2007 | Oshiro et al. | |

(Continued)

FOREIGN PATENT DOCUMENTS

JP 59-007320 1/1984

(Continued)

OTHER PUBLICATIONS

U.S. Office Action dated Oct. 1, 2010, issued in U.S. Patent Appl. No. 12/873,446, filed Sep. 1, 2010.

*Primary Examiner* — Stephen Koziol  
(74) *Attorney, Agent, or Firm* — Drinker Biddle & Reath LLP

(57) ABSTRACT

A microscope system is constructed by a light guiding optical system 20 having an objective lens 21 and beam splitters 27a and 27b for splitting an optical image of a sample S, a photodetector 31 for acquiring an image of the sample S, and two CCD cameras 33 and 34 for focus control disposed on optical paths split by the beam splitters 27a and 27b. The cameras 33 and 34 are disposed being inclined with respect to the optical path so that the optical paths thereof in the light guiding optical system 20 vary along a z-axis direction in opposite directions to each other. Images acquired by these cameras 33 and 34 are analyzed in a focus controller 37, and the image pickup focal point to the sample S is controlled on the basis of the analysis result, whereby the focus control when an image of the sample is acquired can be suitably performed.

6 Claims, 25 Drawing Sheets

U.S. PATENT DOCUMENTS 7,663,078 B2 2/2010 Virág et al.

FOREIGN PATENT DOCUMENTS

| | | |
|---|---|---|
| JP | 60-011810 | 1/1985 |
| JP | 03-117182 | 5/1991 |
| JP | 03-293610 | 12/1991 |
| JP | 08-021961 | 1/1996 |
| JP | 09-230250 | 9/1997 |
| JP | 11-264937 | 9/1999 |
| JP | 2001-318302 | 11/2001 |
| JP | 2002-169101 | 6/2002 |
| JP | 2002-365524 | 12/2002 |
| JP | 3390106 | 1/2003 |

* cited by examiner (a) CAMERA 1  FOCUS POSITION:-4μm   CALCULATED CENTER-OF-GRAVITY OF FOCAL POINT F1: 5.4

(b) CAMERA 2  FOCUS POSITION:-4μm   CALCULATED CENTER-OF-GRAVITY OF FOCAL POINT F2:89.2

F1-F2: -83.8

(a) CAMERA 1  FOCUS POSITION:-2μm   CALCULATED CENTER-OF-GRAVITY OF FOCAL POINT F1: 49.0

(b) CAMERA 2  FOCUS POSITION:-2μm   CALCULATED CENTER-OF-GRAVITY OF FOCAL POINT F2:55.8

F1-F2: -6.8

(a) CAMERA 1 FOCUS POSITION:0μm   CALCULATED CENTER-OF-GRAVITY OF FOCAL POINT F1: 75.2

(b) CAMERA 2 FOCUS POSITION:0μm   CALCULATED CENTER-OF-GRAVITY OF FOCAL POINT F2: 12.0

F1-F2: 63.2

(a) CAMERA 1  FOCUS POSITION:2μm  CALCULATED CENTER-OF-GRAVITY OF FOCAL POINT F1: 94.1

(b) CAMERA 2  FOCUS POSITION:2μm  CALCULATED CENTER-OF-GRAVITY OF FOCAL POINT F2: -13.4

F1-F2: 107.5

(a) CAMERA 1 FOCUS POSITION:4 μm   CALCULATED CENTER-OF-GRAVITY OF FOCAL POINT F1: 120.8

(b) CAMERA 2 FOCUS POSITION:4 μm   CALCULATED CENTER-OF-GRAVITY OF FOCAL POINT F2: -61.6

F1-F2: 182.4

(a)

(b)

(c)

(d)

(e)

(f)

(a)

(b)

(c)

MICROSCOPE SYSTEM

This is a continuation application of application Ser. No. 12/873,446, filed on Sep. 1, 2010, which is a continuation application of application Ser. No. 10/968,261 filed on Oct. 20, 2004, now U.S. Pat. No. 7,813,579, the entire contents of each of which are incorporated by reference herein in their entirety.

BACKGROUND OF THE INVENTION

1. Field of the Invention

The present invention relates to a microscope system used for acquiring an image of sample.

2. Related Background of the Invention

When an image of a sample is acquired by using a microscope, a problem of deviation of the focal point occurs due to inclination of an optical system or a mechanism system in the apparatus, inclination or uneven shape of the sample itself, or the like. Under such a situation, it has been hitherto general in a conventional microscope system to carry out automatic focusing (auto-focus) for controlling the focal point of image pickup of an image pickup device such as a CCD camera or the like. As the device for carrying out automatic focusing as described above are known devices described in, for example, Document 1: Japanese Patent Publication No. 3390106, Document 2: Japanese Patent Application Laid-Open No. Hei-09-230250, Document 3: Japanese Patent Application Laid-Open No. Rei-08-21961 and Document 4: Japanese Patent Application Laid-Open No. Hei-11-264937.

SUMMARY OF THE INVENTION

Of these documents, a microscope described in Document 1 uses a line sensor disposed being inclined with respect to an optical axis, and a rotatable reflection mirror disposed at the front stage of the line sensor. A laser beam is irradiated to a sample and refers to the light amount of a reflected laser beam made incident to the line sensor through the reflection mirror to control the focal point. A microscope disclosed in Document 2 uses a photosensor for detecting the light amount, and a thickness variable glass disposed at the front stage of the photosensor. As in the case of the Document 1, a laser beam is irradiated to a sample, and refers to the light amount of a reflected laser beam made incident to the photosensor through the thickness variable glass to control the focal point.

However, in these apparatus constructions, it is required to irradiate a laser beam for measuring the focal point to a sample when the focal point is controlled. Therefore, there is a problem that the apparatus construction and the image pickup operation are complicated as a whole of the microscope system containing a focus measurement part.

In an automatic focusing device for a microscope disclosed in Document 3, focus control is carried out while a fixing angle varies on the basis of a vertical position perpendicular to an optical axis and an inclined position inclined at a predetermined angle in an image pickup device for acquiring images of a sample. However, there is a case where sufficient precision of focus control is not acquired by the apparatus construction as described above.

A microscope disclosed in Document 4 is equipped with a sensor part in an automatic focusing part, for detecting an optical image branched from an image focusing optical system. The sensor part is displaced to the front or rear side of an estimated focal point face, and the difference in contrast level between the two optical images is detected to carry out the focusing. However, in such an apparatus construction, the sensor part must be moved to acquire two optical images, and thus the apparatus construction and the image pickup operation are complicated. Furthermore, if the optical image of the sample is taken in before the optical path length between the sample and the sensor part has not yet fixed when the sensor part is moved, the optical image is blurred. Therefore, a standby time is required until the optical path length is been fixed. Accordingly, there is a problem that the focusing and the image acquisition of the sample cannot be performed in a short time.

The present invention has been implemented to solve the above problem, and has an object to provide a microscope system which can suitably carry out focus control when an image of a sample is acquired.

In order to achieve the above object, the microscope system of the present invention comprises: (1) a light guiding optical system for guiding an optical image of a sample to a focus control optical path used for focus control; (2) focus control image pickup means disposed on the focus control optical path for acquiring a two-dimensional image based on the optical image guided to the focus control optical path; and (3) focus control means for analyzing the image acquired by the focus control image pickup means, and acquiring focus control information when the image of the sample is picked up on the basis of the analysis result, wherein (4) the focus control image pickup means is equipped with first image pickup means designed so that the optical path length in the light guiding optical system varies along a predetermined variation direction within an image pickup face, and second image pickup means designed so that the optical path length varies along the variation direction and a different variation rate from the first image pickup means within the image pickup face.

In the microscope system described above, image pickup means which can acquire a two-dimensional image is used as the focus control image pickup means for the sample targeted for image acquisition, and also the image pickup means is disposed so as to satisfy an image pickup condition under which the optical path length at which the optical image is guided from the sample varies in the predetermined direction. When the two-dimensional image acquired by using the image pickup means as described above is analyzed and focus control is carried out, irradiation of a focus measuring laser beam to a sample, etc., are not required. Accordingly, the apparatus construction and the image pickup operation can be simplified as a whole of the microscope system containing a focus measurement part.

Furthermore, in the above described system, the focus control image pickup means is constructed by the first image pickup means and the second image pickup means which are designed so that the optical path lengths thereof vary along a predetermined variation direction at different variation rates. A focus measurement is carried out by using two kinds of images acquired by these image pickup means, whereby it is possible to acquire focus control information with high precision when images of the sample are acquired. If the focus control information thus acquired is used, focus control can be suitably performed when the images of the sample are acquired. The first image pickup means and the second image pickup means constituting the focus control image pickup means is preferably designed so that the optical path lengths thereof vary along the predetermined variation direction in opposite directions, whereby the precision of the focus control information thus acquired can be enhanced.

Here, in the microscope system described above, the light guiding optical system is preferably designed so that the optical image of the sample is guided to the focus control optical path used for focus control and an image acquisition optical path used when the image of the sample is picked up; and the microscope system may further comprise: image acquisition image pickup means which is disposed on the image acquisition optical path and used to acquire a one-dimensional or two-dimensional image based on the optical image guided to the image acquisition optical path; and image acquisition control means for controlling the image acquisition by the image acquisition image pickup means. Accordingly, both the sample-image acquisition and focus control for the image pickup can be suitably performed. The image acquisition control means may control setting of an image pickup position to the sample.

As a specific construction, the light guiding optical system may contain optical splitting means for splitting the optical image of the sample to the image acquisition optical path and the focus control optical path, and the image acquisition image pickup means may be constructed separately from the focus control image pickup means. This means the structure where separate image pickup devices are used as the focus control and image acquisition image pickup means.

Alternatively, the light guiding optical system may be designed so that the same optical path as the focus control optical path is constructed as the image acquisition optical path, and the image acquisition image pickup means is constructed by one image pickup device contained in the focus control image pickup means. This means a structure where the same image pickup device is used as the focus control and image acquisition image pickup means.

With respect to the specific construction of the focus control image pickup means for acquiring an image for focus control, each of the first image pickup means and the second image pickup means may be designed to have an image pickup device disposed in a state where the image pickup face thereof is inclined at a predetermined angle with respect to the focus control optical path so that the optical path length thereof varies along the variation direction.

According to the construction as described above, the image acquisition for focus control can be suitably performed.

Alternatively, each of the first image pickup means and the second image pickup means may be designed to have an image pickup device and optical path length changing means disposed at a predetermined position with respect to the image pickup face of the image pickup device so that the optical path length varies along the variation direction. With this construction, the image acquisition for focus control can be also suitably performed. As the optical path length changing means, for example, a light-transmissible optical path length changing member may be used which is formed to have a wedge shape having a predetermined slope.

Alternatively, the focus control image pickup means may be designed to have a single image pickup device, the first image pickup means may be constructed by using first optical path length changing means disposed at a predetermined position with respect to a first image pickup area of the image pickup face of the image pickup device so that the optical path length varies in the variation direction, and the second image pickup means may be constructed by using second optical path length changing means disposed at a predetermined position with respect to a second image pickup area of the image pickup face of the image pickup device so that the optical path length varies along the variation direction at a different variation rate from the first optical path length changing means. In this construction, the focus control image pickup means is constructed by a single image pickup device, and thus the device construction can be simplified.

In this case, the microscope system may further comprise driving means for driving the first optical path length changing means and the second optical path length changing means between a position on the focus control optical path and a position out of the focus control optical path with respect to the image pickup face of the image pickup device.

Alternatively, the image pickup face of the image pickup device may be designed to have a focus measurement area which contains the first image pickup area and the second image pickup area and functions as the focus control image pickup means, and an image acquisition area which functions as image acquisition image pickup means used when the image of the sample is picked up. In these constructions, the image pickup means for focus control and the image acquisition can be constructed by a single image pickup device.

Furthermore, in the above construction, the first optical path length changing means and the second optical path changing means are preferably disposed so that the optical path lengths thereof vary along the variation direction in opposite directions to each other, whereby the precision of the focus control information thus acquired can be enhanced.

With respect to the acquisition of the focus control information using an image acquired by the focus control image pickup means, it is preferable that the focus control means analyzes image contrast variation in the variation direction on the image acquired by the focus control image pickup means, and the focus control information is acquired on the basis of the analysis result, whereby the image pickup focus control using the two-dimensional image of the optical image of the sample can be implemented with high precision.

In this case, specifically, it is preferable that the focus control means cuts out a measurement target image having a predetermined width along the variation direction from the image acquired by the focus control image pickup means, and analyzes the image contrast variation on the basis of a differential absolute value image between the measurement target image and a shift image acquired by shifting the measurement target image in a direction vertical to the variation direction.

Furthermore, it is preferable that the focus control means judges whether the image acquired by the focus control image pickup means is applicable to the acquisition of the focus control information, and if it is judged that the image is applicable, the image is analyzed and the focus control information is acquired on the basis of the analysis result. Therefore, it can be prevented that focus control is carried out by using an improper image, and thus focus control for the image pickup can be suitably performed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
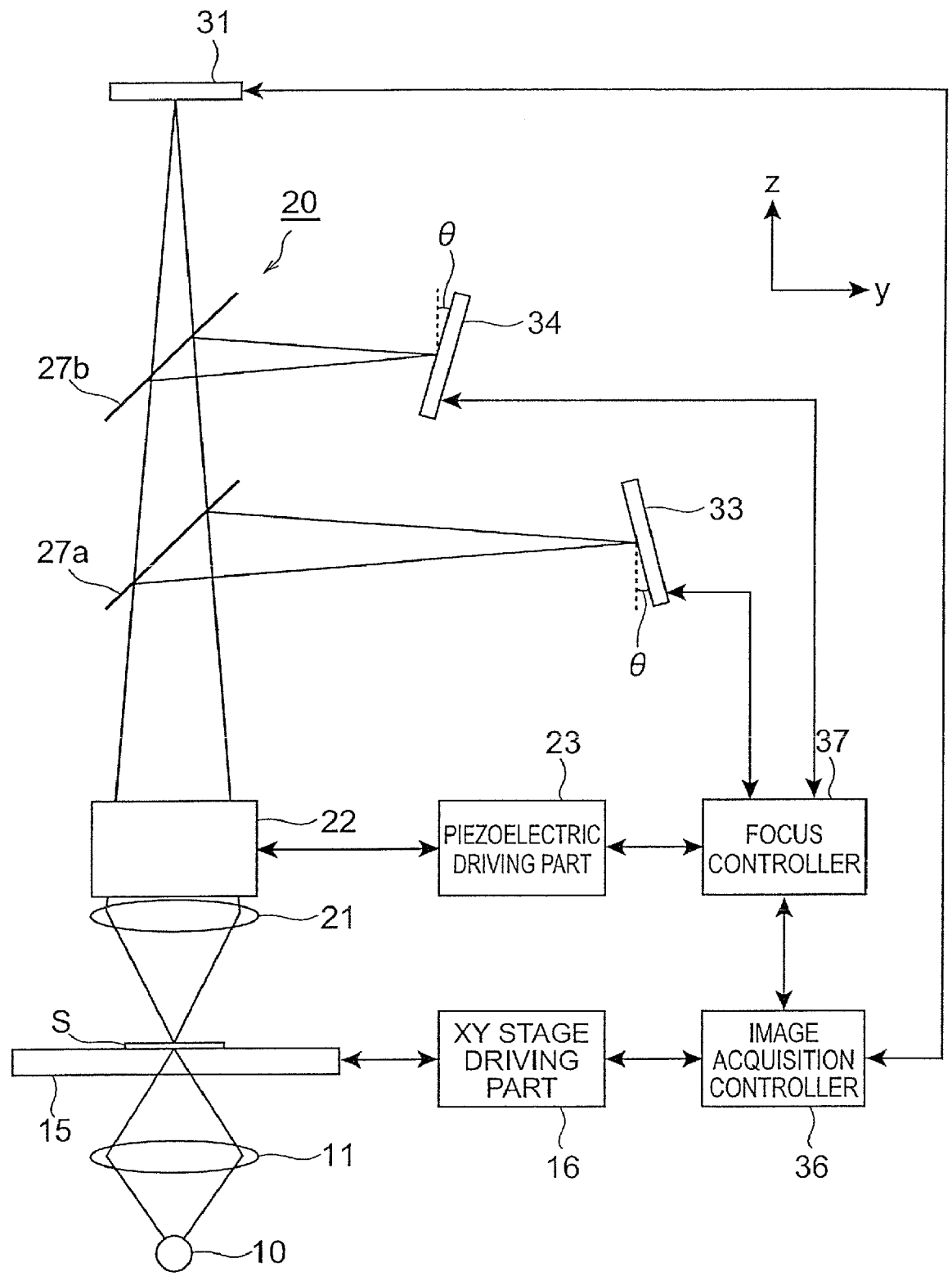
FIG. 1 is a block diagram showing the construction of a first embodiment of a microscope system.

Preferred embodiments of a microscope system according to the present invention will be described below in detail with reference to the drawings. In the description of drawings the same elements will be denoted by the same reference symbols, without redundant description. It is also noted that dimensional ratios in the drawings do not always agree with those in the description.

FIG. 1 is a block diagram showing the construction of a first embodiment of a microscope system according to the present invention. The microscope system is designed as a transmission type microscope used to acquire an image of a sample S. The sample S targeted to acquire an image is, for example, a living organism sample, and it is placed on a sample stage 15.

The sample stage 15 comprises an XY stage movable in the x-direction and y-direction (horizontal directions), and an image pickup position to the sample S is set or changed by driving the XY stage 15 on the xy plane. The sample stage 15 is controlled by an XY stage driving part 16. At the lower side of the sample stage 15 are disposed an irradiation light source 10 for irradiating the sample S with light for generating an optical image which is a target for image pickup and a light converging lens 11 for converging the light from the irradiation light source 10 to the image pickup position set for the sample S.

A light guiding optical system 20 for guiding the optical image of the sample S is equipped above the sample stage 15 with respect to the sample S on the sample stage 15 irradiated with light from the irradiation light source 10. In this embodiment, the light guiding optical system 20 has an objective lens 21 to which light from a sample S is made incident, and beam splitters 27a and 27b disposed at the rear stage of the objective lens 21. The beam splitters 27a and 27b constitute optical splitting means for splitting an optical image of the sample S to an image acquisition optical path and a focus control optical path.

In FIG. 1, an optical path along which light from the objective lens 21 passes through the beam splitters 27a and 27b corresponds to the image acquisition optical path used when the image of the sample S is picked up. Furthermore, an optical path along which light from the objective lens 21 is reflected by the beam splitter 27a and an optical path along which the light is reflected by the beam splitter 27b are focus control optical paths used to acquire focus control information when the image of the sample S is picked up.

The beam splitter 27a disposed at the front stage and the beam splitter 27b at the rear stage are arranged at an angle of about 45° with respect to the image acquisition optical path, and the focus control optical paths from the beam splitters 27a and 27b are substantially perpendicular to the image acquisition optical path. Here, in order to simplify the description, the direction which corresponds to the optical axis direction of the microscope optical system containing the irradiation light source 10 and the objective lens 21 and is along the image acquisition optical path is set as a z-axis direction, the direction which is perpendicular to the image acquisition optical path and along the focus control optical path is set as a y-axis direction, and the direction perpendicular to the y-axis and the z-axis is set as an x-axis direction.

A piezoelectric actuator 22 is equipped for the objective lens 21. The piezoelectric actuator 22 is objective lens driving means for driving the objective lens 21 in the z-axis direction (vertical direction, optical axis direction). The driving of the piezoelectric actuator 22 is controlled by a piezoelectric driving part 23. In the microscope system of this embodiment, the focal point of the image pickup to acquire an image of the sample S can be adjusted by varying the position of the objective lens 21 in the z-axis direction by using the piezoelectric actuator 22.

On the image acquisition optical path, a photodetector 31 is disposed at the position corresponding to the image forming plane of the optical image of the sample S passed through the beam splitters 27a and 27b. The photodetector 31 serves as the image acquisition image pickup means used to acquire an image based on the optical image split to the image acquisition optical path by the beam splitters 27a and 27b. As the photodetector 31 specifically is used a linear sensor which can acquire a one-dimensional image of the sample S or an image sensor which can acquire a two-dimensional image.

On the focus control optical path at the front stage, an image pickup device 33 is disposed at a position corresponding to the image forming plane of the optical image of the sample S which is reflected by the beam splitter 27a. Furthermore, on the focus control optical path at the rear stage, an image pickup device 34 is disposed at a position corresponding to the image forming plane of the optical image of the sample S which is reflected by the beam splitter 27b. Each of the image pickup devices 33 and 34 comprises a CCD camera which can acquire a two-dimensional image.

The CCD cameras 33 and 34 comprise first and second image pickup means for acquiring images based on the optical image which are split by the beam splitters 27a and 27b. These cameras 33 and 34 constitute the focus control image pickup means of this embodiment. That is, according to the microscope system shown in FIG. 1, the focus control information when the image of the sample S is picked up by the photodetector 31 is acquired by using the two-dimensional images of the sample S which are acquired by the CCD cameras 33 and 34, and also focus control is carried out based on the focus control information thus acquired.

Specifically, the CCD camera 33 serving as the first image pickup means of the focus control image pickup means has an image pickup face which is substantially coincident with the xz plane perpendicular to the optical path, and disposed being inclined at an angle θ with respect to the optical path with the z-axis direction set as the inclination direction. At this time, on the image pickup face of the CCD camera 33, the optical path length in the light guiding optical system 20 for which the light is guided from the sample S to the CCD camera 33 varies along the z-axis direction as the variation direction.

The CCD camera 34 serving as the second image pickup means of the focus control image pickup means has an image pickup face which is substantially coincident with the xz plane perpendicular to the optical path, and disposed being inclined in the opposite direction to the camera 33 at an angle θ with respect to the optical path with the z-axis direction set as the inclination direction. At this time, within the image pickup face of the CCD camera 34, the optical path length in the light guiding optical system 20 for which the light is guided from the sample S to the CCD camera 34 varies along the z-axis direction of the variation direction and in the opposite direction to the camera 33.

An image acquisition controller 36 and a focus controller 37 are equipped for the sample stage 15, the light guiding optical system 20, the photodetector 31 and the CCD cameras 33 and 34. The image acquisition controller 36 is control means for controlling the image acquiring operation of the sample S by controlling the acquisition of the image of the sample S and the setting of the image pickup position to the sample S. Specifically, the image acquisition controller 36 controls the acquisition of the image by the photodetector 31. Furthermore, the controller 36 controls the driving of the sample stage 15 through the XY stage driving part 16 to set or vary the image pickup position on the optical axis of the microscope optical system for the sample S mounted on the sample stage 15.

The focus controller 37 analyzes the images acquired by the CCD cameras 33 and 34 according to a predetermined analysis method. The focus control information when the image of the sample S is picked up by the photodetector 31 is acquired on the basis of the analysis result. Furthermore, the focus controller 37 may control the focal point of the image pickup by the photodetector 31 based on the acquired focus control information. In this embodiment, the focus controller 37 controls the driving of the piezoelectric actuator 22 through the piezoelectric driving part 23 to adjust the position of the objective lens 21 in the z-axis direction, thereby performing focus control for the image pickup.

Here, the cameras 33 and 34 serving as the focus control image pickup means are disposed being inclined with respect to the optical axis of the focus control optical path. Therefore, the two-dimensional images acquired by the CCD cameras 33 and 34 become images in which the deviation from the focus position varies along the z-axis direction. The image in which the deviation from the focus position varies along a predetermined variation direction as described above is analyzed in focus controller 37, thereby acquiring focus control information, such as deviation of the focal point for image pickup, necessity or non-necessity of focusing, a correction amount required to match the focal point, etc. Furthermore, the direction at which the deviation from the focus position varies is opposite from each other between the images acquired by the cameras 33 and 34. By using the two kinds of images as described above, the focus control information can be acquired with high precision.

Figure 2:
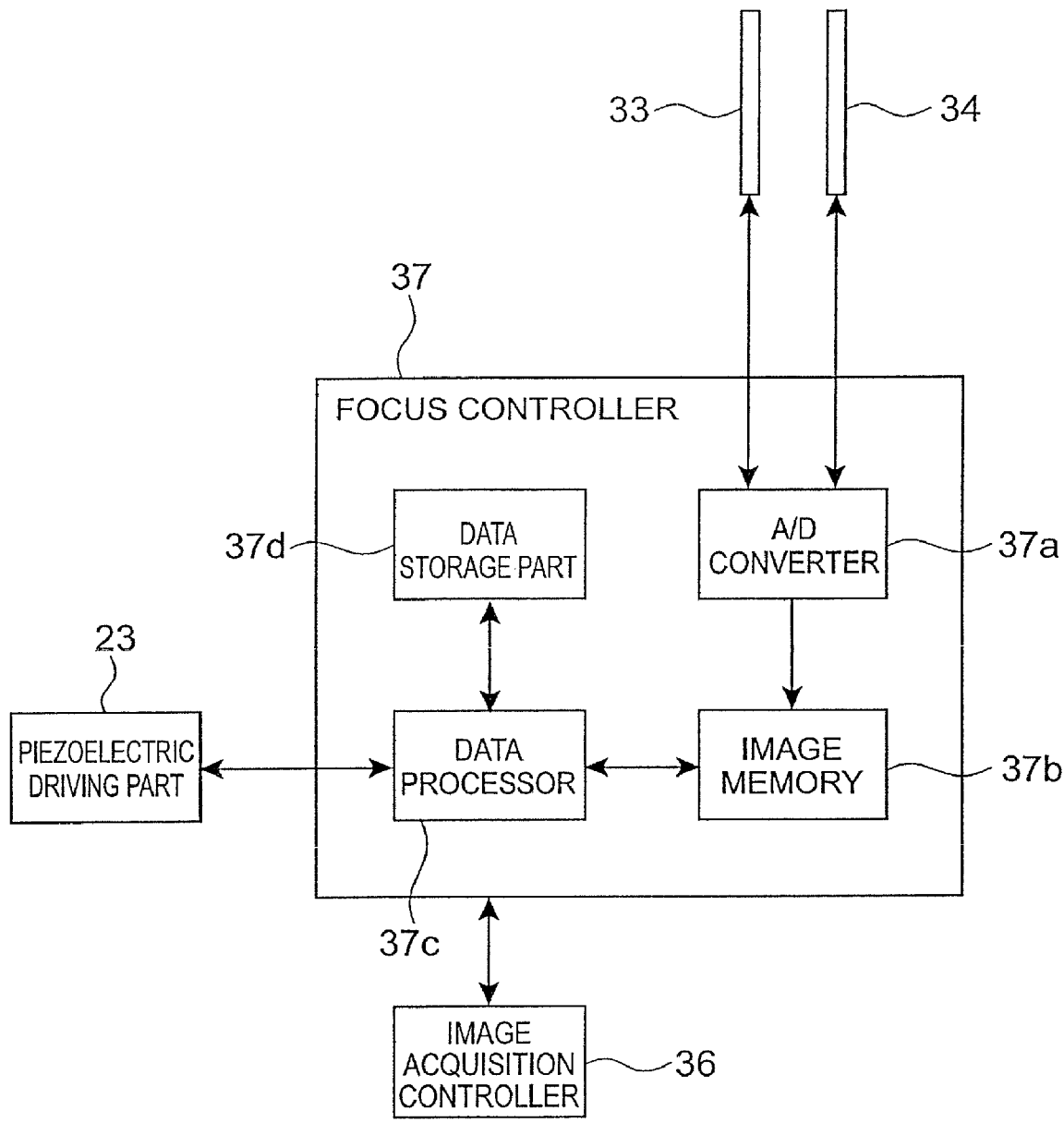
FIG. 2 is a block diagram showing an example of the construction of a focus controller.

FIG. 2 is a block diagram showing an example the specific construction of focus controller 37. In this example, focus controller 37 comprises an A/D converter 37a, an image memory 37b, a data processor 37c and a data storage part 37d. A data signal of an image acquired by the CCD cameras 33 and 34 is subjected to A/D conversion in the A/D converter 37a, and then stored as image data for focus control in the image memory 37b. A data processor 37c reads out necessary image data from an image memory 37b to analyze the image data thus read out, and also acquires the focus control information when the image of the sample S picked up by the photodetector 31 based on the analysis result, and stores the focus control information thus acquired into a data storage part 37d. When the image of the sample S is actually picked up by the photodetector 31, the data processor 37c controls the piezoelectric driving part 23 by referring to the focus control information thus acquired and carries out focus control for the image pickup.

The effect of the microscope system according to this embodiment will be described.

In the microscope system shown in FIG. 1, the CCD cameras 33 and 34 which can acquire two-dimensional images are used for the sample S which is a target of the image acquisition as the image pickup means used for focus control, and the cameras 33 and 34 are disposed so as to satisfy the image pickup condition where the optical path length over which the optical image is guided from the sample S varies in a predetermined direction. According to the construction where the two-dimensional images acquired by using the cameras 33 and 34 are analyzed to carry out focus control, irradiation of a focus measuring laser beam to a sample, etc., are not required. Accordingly, the apparatus construction and the image pickup operation can be simplified as a whole of the microscope system containing the focus measurement part.

In the above system, the focus control image pickup means is constructed by the CCD camera 33 serving as the first image pickup means and the CCD camera 34 serving as the second image pickup means which are designed so that the optical path lengths thereof vary along a predetermined variation direction in opposite directions to each other. By carrying out the focus measurement with the two kinds of images acquired by the image pickup means described above, the focus control information when the image of the sample S is acquired by the photodetector 31 serving as the image acquisition image pickup means can be acquired with high precision. Furthermore, by using the focus control information thus acquired, focus control can be suitably performed when the image of the sample S is acquired.

Specifically, in the above construction, the two CCD cameras 33 and 34 disposed being inclined in opposite directions to each other with the z-axis direction set as the inclination direction are used to acquire the focus control information. As described above, the focus measurement is carried out by using the two image pickup devices inclined in opposite directions, and thus even when a contrast pattern of the sample S itself is non-uniform, the effect thereof can be suppressed and focus control can be suitably performed. In the construction as described above, it is preferable that the two cameras 33 and 34 are disposed so that the inclinations thereof are symmetrical with each other with respect to the optical axis.

With respect to the acquisition of the focus control information by the focus controller 37 and the actual execution of the focus control, the image acquisition by the photodetector 31 can be performed simultaneously in parallel to the focus measurement by the cameras 33 and 34. In this case, the focus control information is acquired from the images acquired by the cameras 33 and 34 in the focus controller 37, and at the same time the focal point of the image pickup can be feedback-controlled by using the focus control information.

As described above, a real-time focus technique for carrying out focus control using a two-dimensional image of the sample S acquired by the CCD cameras 33 and 34 on a real-time basis while an image of the sample S is acquired by the photodetector 31 is effective to increase the speed of the image acquiring work of the sample S. For example, development of a virtual slide in which the overall living organism sample is computerized as image data has been recently promoted, and in order to carry out the computerization of such a sample at high speed, real-time focus control is very important.

Furthermore, the image acquisition by the photodetector 31 and the focus measurement by the cameras 33 and 34 may be separately carried out. For example, it is possible to carry out the focus measurement by the cameras 33 and 34 while scanning the image pickup position at the sample S in advance, thereby creating a focus control information map for the sample S. In this case, after the focus control information map is created, focus control is executed by referring to the map, and the image acquisition is carried out by the photodetector 31 while scanning the image pickup position at the sample S. As described above, when the focus control information map, is created, the photodetector 31 for the image acquisition is not required. Furthermore, in the focus measurement, the light guiding optical system 20 may be designed so that the optical image of the sample S is guided to the focus control optical path. In this case, it is unnecessary to provide the optical splitting means such as the beam splitter or the like if occasion demands.

When the focus control information map is created, it is not necessarily required to carry out the focus measurement and the acquisition of the focus control information to all the image pickup areas of the sample S. For example, the focus measurement is carried out on a plurality of image pickup areas suitably selected on the sample S to acquire the focus control information. Then, by use of the plurality of focus control information thus obtained, the focus control information for the image pickup areas which focus measurement has not carried out is subjected to interpolation processing, whereby a focus control information map for all the image pickup areas can be created. This method can shorten the time required to create the focus control information map.

In this embodiment, the CCD cameras 33 and 34 constituting the focus control image pickup means are designed so that the optical path lengths thereof vary along a predetermined variation direction in opposite directions to each other as described, whereby the precision of the focus control information acquired can be enhanced. The first image pickup means and the second image pickup means of the focus control image pickup means may be generally designed so that the optical path lengths vary along the predetermined variation direction at different variation rates. As such a construction, for example, a construction may be used where the optical path lengths vary in the same direction, but at different variation rates.

In the above embodiment, focus control from the sample S to the photodetector 31 is carried out by controlling the driving of the piezoelectric actuator 22 and adjusting the position of the objective lens 21 in the z-axis direction. Accordingly, the feedback control of the focal point using the image acquired by the CCD cameras 33 and 34 can be surely performed at high speed. However, for such a focus control, not only a construction for driving the objective lens 21, but also, for example, a construction for driving in the z-axis direction the sample stage 15 on which the sample S is placed can be used. Furthermore, in place of the piezoelectric actuator, a stepping motor or the like may be used as the driving mechanism for driving the objective lens 21 or the sample stage 15.

Furthermore, with respect to the image pickup device for acquiring a two-dimensional image of the sample S used for focus control, other image pickup devices which can acquire two-dimensional images, such as a CMOS type image pickup device or the like, may be used in place of the CCD camera.

The focus control method for the microscope system shown in FIG. 1 will be described.

Figure 3:
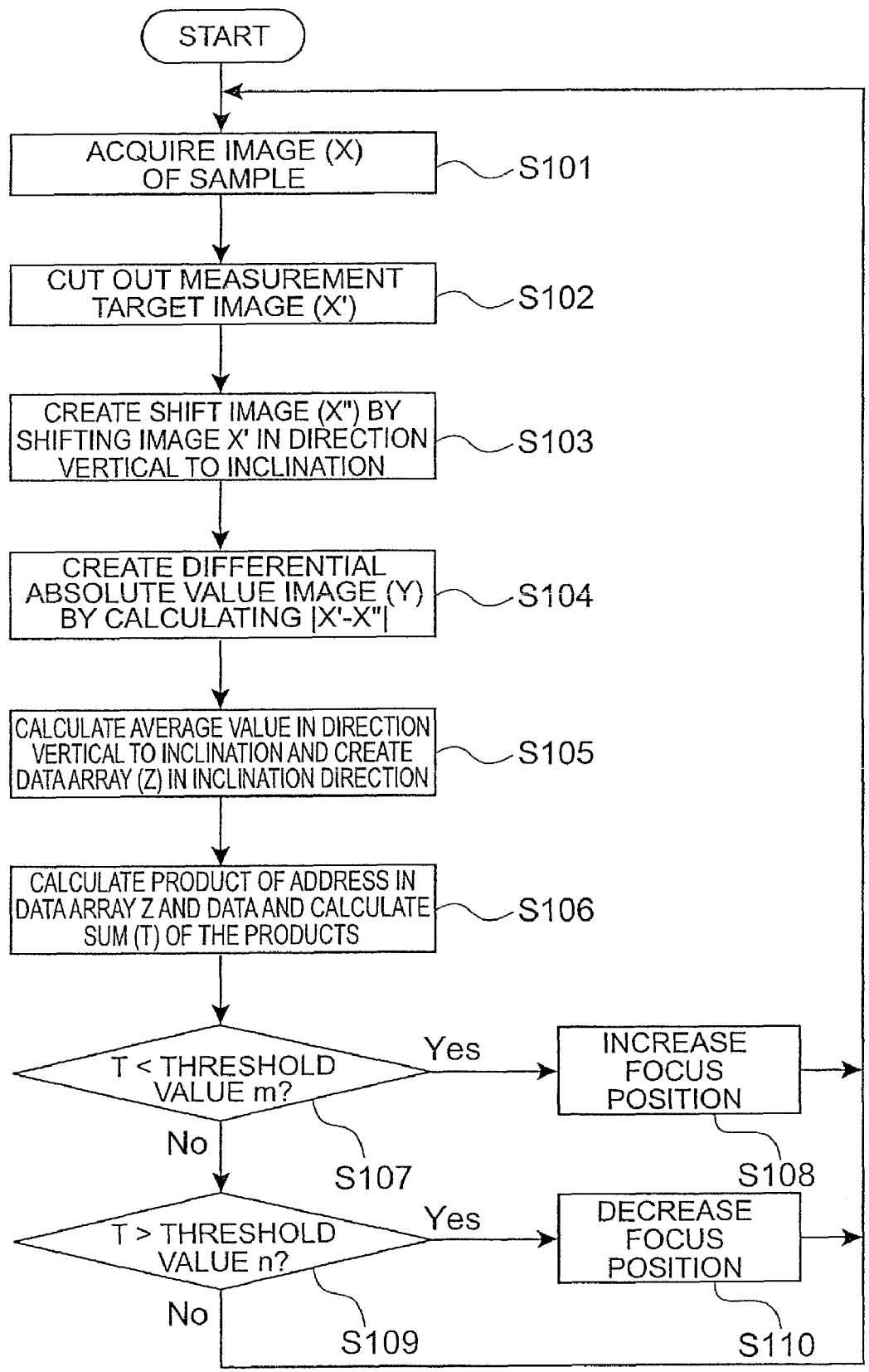
FIG. 3 is a flowchart showing an example of a focus control method when a single image pickup device is used.
Figure 4:
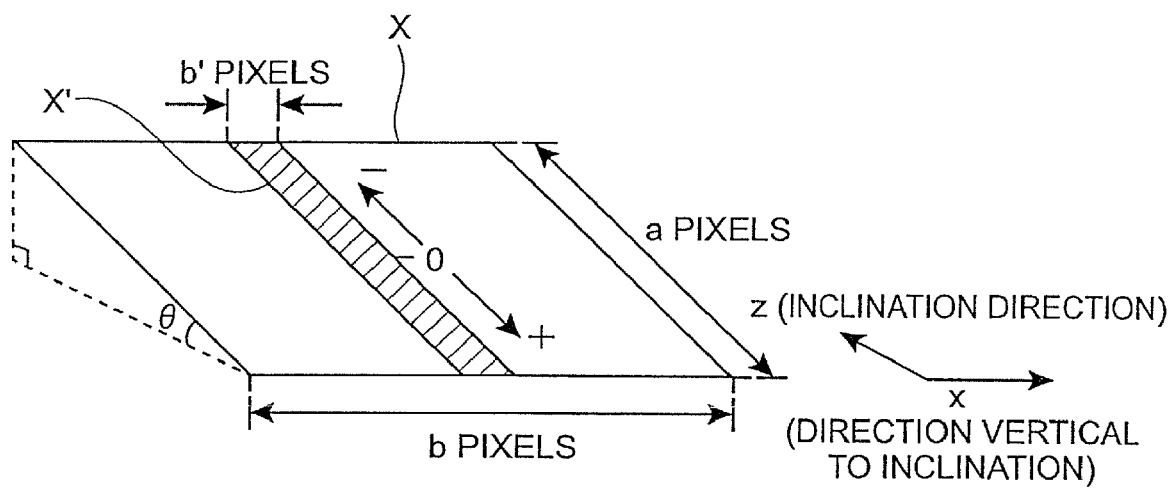
FIG. 4 is a schematic diagram showing the focus control method shown in FIG. 3.

First, a focus control method when only a single CCD camera 33 is used as the focus control image pickup means will be described. FIG. 3 is a flowchart showing an example of the focus control method. FIG. 4 is a schematic diagram showing the focus control method shown in FIG. 3. Focus control described below is carried out by focus controller 37 constructed as shown in FIG. 1.

In the control method, as shown in FIG. 4, a two-dimensional image X of the sample S comprising a pixels x b pixels is acquired by the CCD camera 33 (step S101). The a pixels are located in the z-axis direction corresponding to the inclination direction of the image pickup face while the b pixels are located in the x-axis direction vertical to the inclination. Then, a measurement target image X' which comprises the full width (a pixels) in the inclination direction and a fixed width (b' pixels) in the direction vertical to the inclination and also is along the inclination direction are cut out from the image X (S102).

Subsequently, with respect to the measurement target image X' thus cut out, a shift image X" is created by shifting the measurement target image X' by fixed pixels (s pixels) in the direction vertical to the inclination (S103). The difference (X'−X") between the image X" and the image X' is calculated, and further the absolute value thereof |X'−X"| is calculated to create the differential absolute value image Y (S104). The differential image Y thus acquired becomes an image of a x (b'−s) pixels because pixels by the number of which the measurement target image X' is shifted are invalid. Here, with respect to the number s of pixels for shifting the measurement target image X', a suitable pixel number is preferably selected in consideration of the optical magnification and the numerical aperture NA of the objective lens.

Subsequently, with respect to the differential absolute value image Y, an average value is calculated on the basis of b'−s pixels in the direction vertical to the inclination, and a data array Z of the a pixels in the inclination direction is created (S105). The differential absolute value image Y and the data array Z averaged in the direction vertical to the inclination corresponds to the absolute value of a differential value of the image component at each position of the measurement target image X' along the inclination direction.

When the contrast pattern of the sample S targeted to acquire an image is uniform, in an image acquired by the camera 33, the contrast becomes larger as the focal point is matched. Furthermore, when the image contrast is large, the absolute value of the differential value of the corresponding image component is increased. Accordingly, information on focus control is acquired by carrying out analysis to determine variation of the data value corresponding to the contrast variation of the image in the inclination direction for the data array Z. By referring to the analysis result, focus control of image pickup can be suitably performed.

In FIG. 3, specifically, with respect to each data of the data array Z, addresses are allocated to the data at the respective positions on the assumption that the address of the center position along the inclination direction is set to 0, the address of each position in the plus direction of the z-axis which is inclined forward is set to −, and the address of each position in the minus direction of the z-axis which is inclined rearward is set to + as shown in FIG. 4. The product between each address in the data array Z and the data thereof is calculated, and the sum T of the products is calculated (S106).

With respect to the sum T thus calculated, when the sum T is a negative value, the present focus position is located at a nearer position than the correct focus position, and as the absolute value thereof is larger, the displacement of the focus position from the correct focus position is larger. On the other hand, when the sum T is a positive value, the present focus position is located at a farther position than the correct focus position, and as the absolute value thereof is larger, the displacement of the focus position from the correct focus position is larger. Accordingly, if focus control is carried out by referring to the sum T as described above, the actual focus position can be approached to the correct focus position.

As a specific control method, for example, a negative-side threshold value m and a positive-side threshold value n are set for the sum T, and if the sum T is out of the range between the threshold values m and n, the focus position is adjusted. According to this method, as shown in FIG. 3, it is judged whether the sum T is smaller than the negative threshold value m (T<threshold value m) (S107). If the sum T is smaller than the threshold value m, focus control is carried out so as to increase the focus position (S108). It is judged whether the sum T is larger than the positive threshold value n (T>threshold value n) (S109). If the sum T is larger than the threshold value n, focus control is carried out so as to decrease the focus position (S110).

Focus control operation of the above steps S101 to S110 is repeated by scanning the image pickup position of the sample S, whereby an image of the sample S can be acquired at high speed with excellent image quality.

In the focus control method described above, creation of the data array Z is carried out for every pixel. However, the specific creating method of the data array Z is not limited to the above method. For example, the data array Z may be created by carrying out thinning-out processing every a plurality of pixels by sampling. According to this method, the speed of focus control can be further increased.

Figure 5:
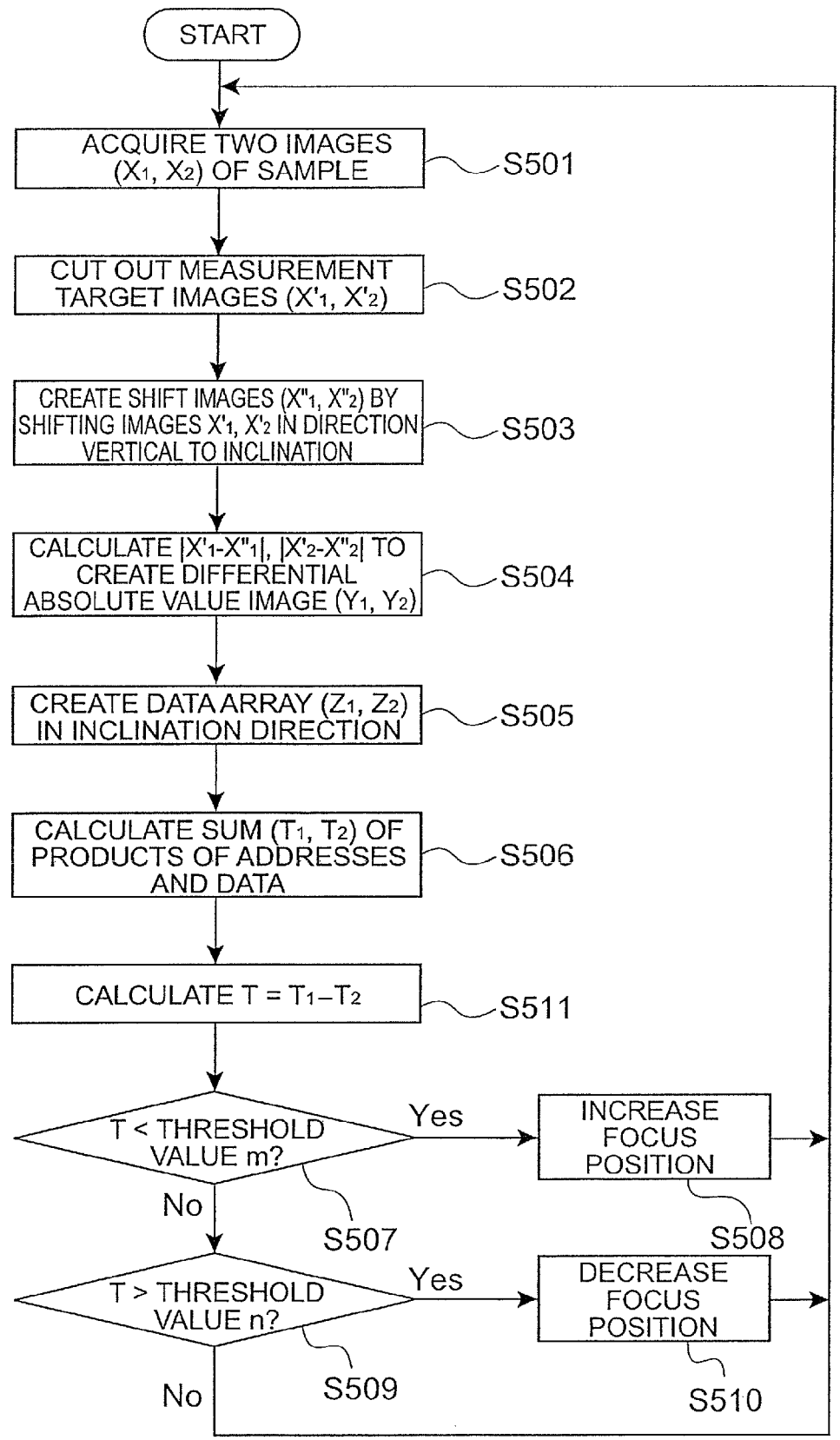
FIG. 5 is a flowchart showing an example of the focus control method when two image pickup devices are used.

Next, a focus control method when the two cameras of the CCD cameras 33 and 34 described above are used as the focus control image pickup means will be described. FIG. 5 is a flowchart showing an example of the focus control method. The following focus control is carried out by the focus controller 37 shown in FIG. 1. A specific analysis method of images is the same as the focus control method shown in FIG. 3 and FIG. 4.

According to this control method, two two-dimensional images $X_1$, $X_2$ of the sample S are first acquired by the CCD cameras 33 and 34 (step S501), and then measurement target images $X_1'$ and $X_2'$ are cut out along the inclination directions from the images $X_1$ and $X_2$, respectively (step S502). As described above, the measurement target images $X_1'$ and $X_2'$ are inclined along the z-axis in opposite directions to each other.

Subsequently, shift images $X_1''$ and $X_2''$ are created by shifting the measurement target images $X_1'$ and $X_2'$ thus cut out in the directions vertical to the inclination directions thereof by only a fixed number of pixels (S503). With respect to the image $X_1$ acquired by the camera 33, the difference $(X_1'-X_1'')$ between the image $X_1''$ and the image $X_1'$ is taken, and the absolute value $|X_1'-X_1''|$ thereof is calculated to create a differential absolute value image $Y_1$. Furthermore, with respect to the image $X_2$ acquired by the camera 34, the difference $(X_2'-X_2'')$ between the image $X_2''$ and the image $X_2'$ is taken, and the absolute value $|X_2'-X_2''|$ thereof is calculated to create a differential absolute value image $Y_2$ (S504).

Subsequently, with respect to the differential absolute value images $Y_1$ and $Y_2$, the average value thereof is calculated in the direction vertical to the inclination, and data arrays $Z_1$ and $Z_2$ in the inclination direction are created (S505). Furthermore, with respect to each data of the data arrays $Z_1$ and $Z_2$, the address at the center position is set as 0, and the addresses are allocated to the data at the respective positions. The product between each address of the data array $Z_1$, $Z_2$ and the data thereof is taken, and the sum $T_1$, $T_2$ is calculated (S506). The address allocation to the data arrays $Z_1$, $Z_2$ is carried out in the same direction with respect to the z-axis direction corresponding to the inclination direction of the image pickup face.

In the focus control method shown in FIG. 5, with respect to the sums $T_1$ and $T_2$ calculated for the two images $X_1$ and $X_2$ acquired by the cameras 33 and 34, the difference $T=T_1-T_2$ is calculated (S511). Focus control using threshold values m and n is carried out by referring to the difference T of the sums (S507 to S510).

By repetitively carrying out the focus control operation of the steps S501 to S511 described above while scanning the image pickup position at the sample S, images of the sample S can be acquired at high speed with high image quality. Particularly, in this embodiment, the images $X_1$ and $X_2$ acquired by the CCD cameras 33 and 34 being inclined in opposite directions to each other are used, and focus control is carried out by taking the difference T between the sums $T_1$ and $T_2$ which are calculated for the two images $X_1$ and $X_2$, whereby the effect of the contrast pattern of the sample S itself can be reduced. In the focus control method described above, when only the acquisition of the focus control information is carried out, for example, when a focus control information map is created, the focus control information thus acquired may be stored in a data storage part and used for focus control as occasion demands.

In the focus control method described above, creation of the data arrays $Z_1$ and $Z_2$ is carried out for every pixel. However, the specific creating method of the data array $Z_1$ and $Z_2$ is not limited to the above method. For example, the data array $Z_1$ and $Z_2$ may be created by carrying out thinning-out processing every a plurality of pixels by sampling. According to this method, the speed of focus control can be further increased.

Figure 6:
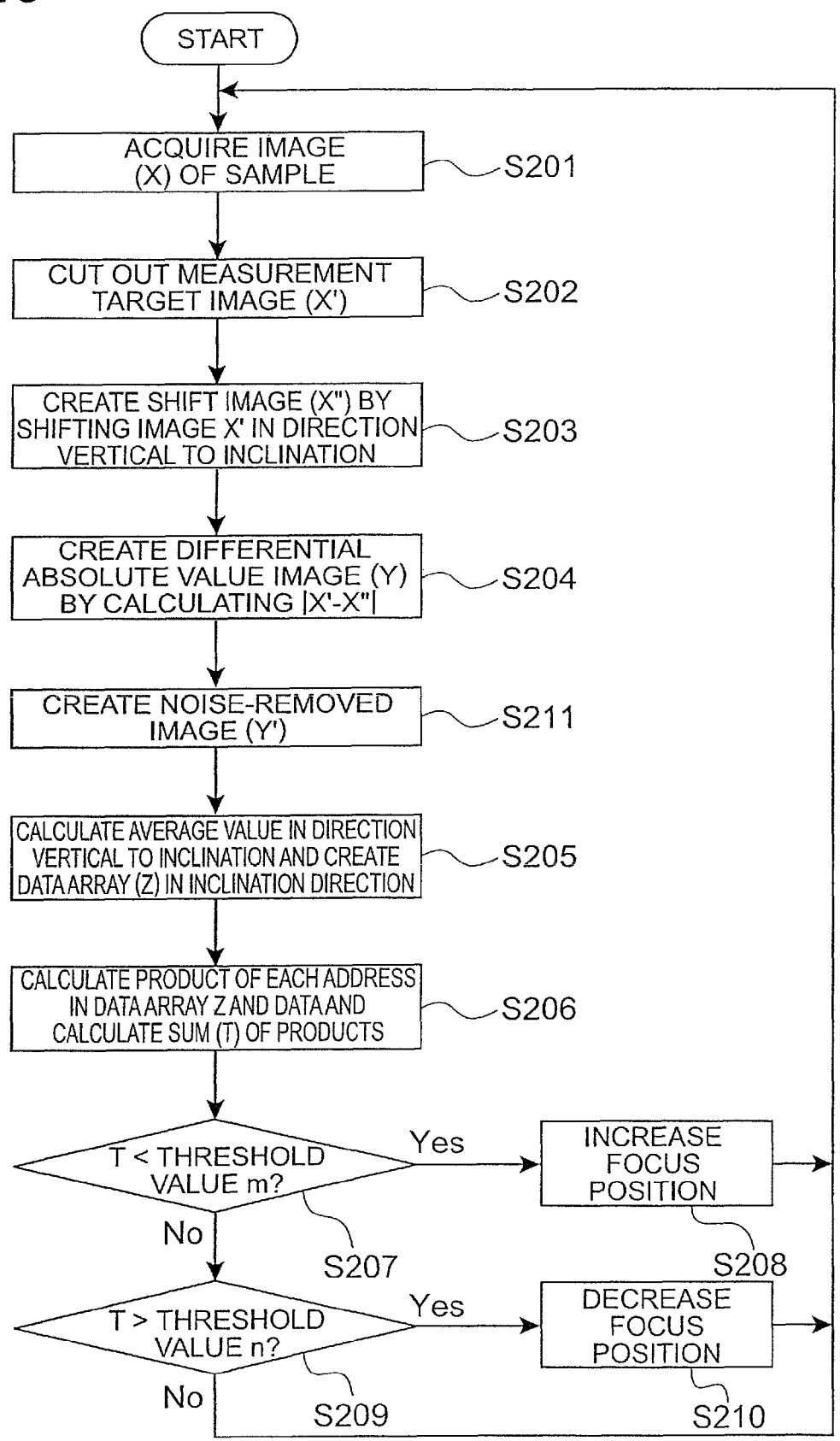
FIG. 6 is a flowchart showing another example of the focus control method when a single image pickup device is used.
Figure 7:
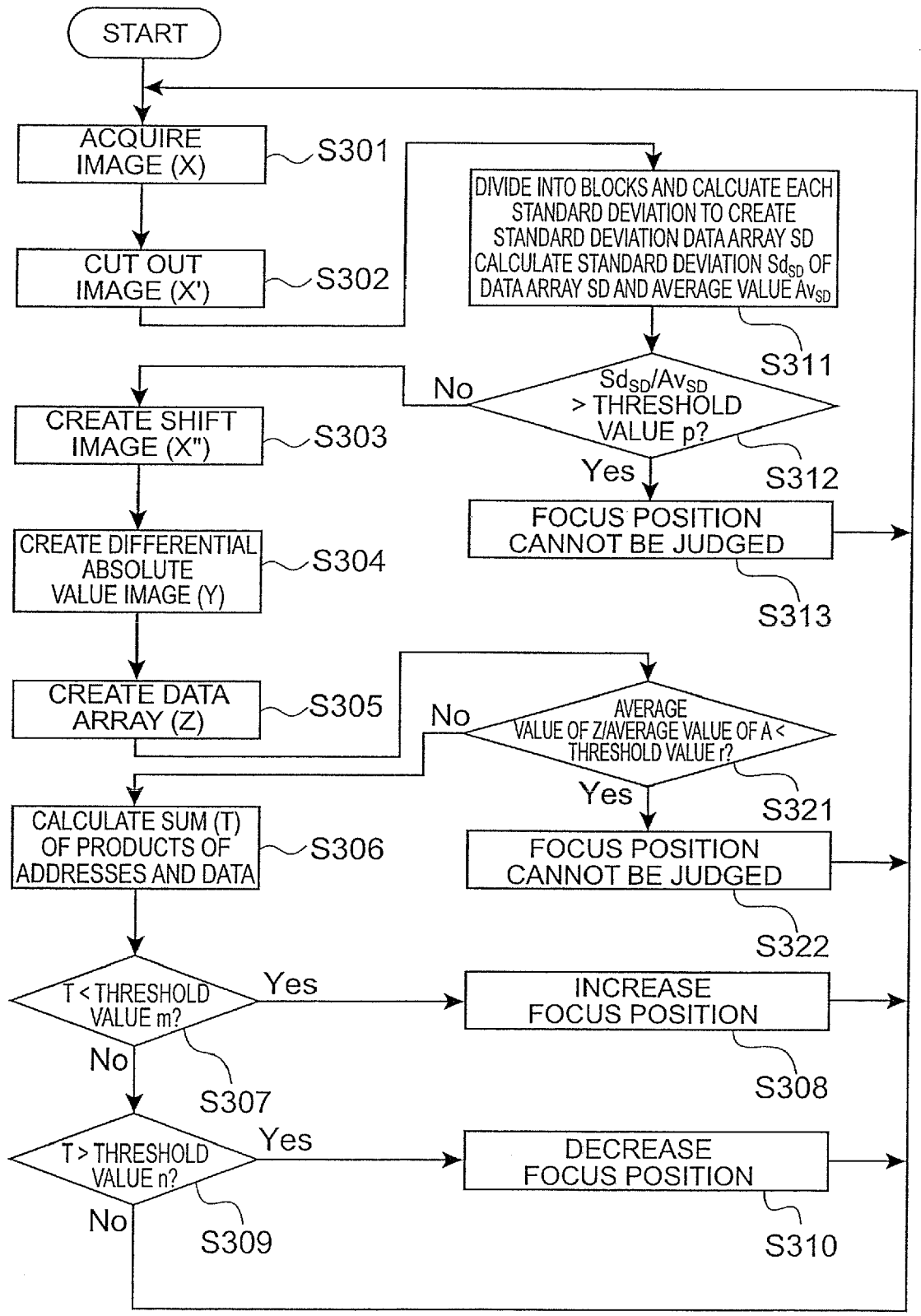
FIG. 7 is a flowchart showing another example of the focus control method when a single image pickup device is used.

Furthermore, various methods as shown in FIG. 6 and FIG. 7 may be used as the focus control method in addition to the above-described focus control method. The flowcharts of FIG. 6 and FIG. 7 correspond to FIG. 3 when a single CCD camera is used, however, they can be likewise applicable to the focus control method of FIG. 5 when two CCD cameras are used.

FIG. 6 is a flowchart showing another example of the focus control method. In this control method, the steps S201 to S210 are the same as the steps S101 to S110 of the control method of FIG. 3.

In this control method, a step S211 for removing noise is equipped between a step S204 for creating a differential absolute value image Y and a step S205 for creating a data array Z in the inclination direction. In this case, in order to remove an effect of image noise in the differential absolute value image Y on focus control, a noise level p is set to the data value of each pixel.

In the respective pixels of the differential absolute value image Y, if the data value of some pixel is smaller than the noise level p, the data value of the pixel concerned is set to zero as noise data, and a differential absolute value image Y' from which the noise is removed is created (S211). The data array Z in the inclination direction is created by using the noise-removed image Y'. Accordingly, the effect imposed on focus control by noises caused by the light guiding optical system 20 and the CCD camera 33 can be suppressed.

FIG. 7 is a flowchart showing another example of the focus control method. In this control method, the steps S301 to S310 are the same as the steps S101 to S110 in the control method of FIG. 3.

In this control method, focus controller 37 judges whether the image acquired by the CCD camera 33 is applicable to the control of the image pickup focal point. If it is judged to be applicable, the image is analyzed and the focal point for the image pickup is controlled on the basis of the analysis result.

Specifically, steps S311 to S313 are added between the step S302 of cutting out the measurement target image X' and the step S303 of creating the shift image X". In this case, with respect to the measurement target image X', the image X' is divided into blocks, and the standard deviations of the respective blocks are calculated to create a standard deviation data array SD. A standard deviation $Sd_{SD}$ and an average value $AV_{SD}$ are calculated from the standard deviation data array SD (S311), and it is judged whether the ratio $Sd_{SD}/Av_{SD}$ between the standard deviation and the average value is larger than the threshold value p ($Sd_{SD}/AN_{SD}$>threshold value p) (S312). If it is larger than the threshold value p, the contrast of the sample S itself is non-uniform, and thus it is judged that the focus position cannot be judged (S313), so that focus control is not carried out.

Furthermore, steps S321 and S322 are added between the step S305 of creating the data array Z in the inclination direction and the step S306 of calculating the sum T of the products of the addresses in the data array Z and the data thereof. In this case, with respect to the measurement target image X', an average value is calculated by b' pixels in the direction vertical to the inclination, and a data array A with the a pixels in the inclination direction is created. In addition, it is judged whether the average value of the data array Z/the average value of the data array A (corresponds to variation amount/brightness, that is, contrast) is smaller than the threshold value r (average value of Z/average value of A<threshold value r) (S321). If it is smaller than the threshold value r, the sample S does not exist at the image pickup position, or the focal point is greatly deviated. Therefore, it is judged that the focus position cannot be judged (S322), and thus focus control is not carried out.

As described above, with respect to the image acquired by the CCD camera, after it is judged whether the image is suitable for focus control, the analysis of the image and focus control are carried out, whereby focus control can be prevented from being carried out by using an improper image, and focus control for image pickup can be suitably performed.

In each of the focus control methods as described above, the analysis of the contrast variation of the image for focus control is carried out by using the differential absolute value image between the measurement target image cut out by a predetermined width along the inclination direction of the image pickup face and the shift image of the measurement target image. By using the method as described above, the contrast variation of the image can be surely analyzed by using an easy method. With respect to the specific analyzing method of the contrast, methods other than described above may be used.

In the focus control method, the data arrays A and Z are created for every pixel, however, the specific creating method of the data arrays is not limited to the above method. For example, the thinning-out processing based on the sampling for every a plurality of pixels may be carried out to create each data array. Such a method can further increase the speed of focus control.

In the method shown in FIG. 7, the block dividing the image X' in the steps S311 and S312 is not limited to a two-dimensional matrix division, but it may be a one-direction block-division. Furthermore, with respect to the size of the blocks, a suitable size is preferably set in consideration of optical magnification, the size of the CCD camera, the number of pixels, etc.

Furthermore, in the above method, in the steps S313 and S322, when a target image is not a uniform contrast pattern or when a sample S exists at only a part of an image and thus a sufficient contrast level is not obtained, it is judged that the focus position cannot be specified, and thus focus control is not carried out. On the other hand, when the stage 15 is driven to successively acquire images of the sample S, focus control information concerning an image pickup position at which the focus position cannot be judged may be set by referring to focus control information concerning another image pickup position. In this case, for example, focus control may be carried out under the state where focus control information concerning the image pickup position at which the focus position cannot be judged is regarded as any focus control information acquired through a series of focus measurements and stored in the data storage part 37d or as the same as the closest (latest) focus control information.

With respect to focus control using the image acquired by the CCD cameras 33 and 34, focus control for image pickup can be implemented with high precision by using the method of analyzing the contrast variation of the image. However, methods other than the method of using the contrast variation may be used as the focus control method.

An example of the focus control method using the microscope system described above will be described. Here, in the following description, with respect to the two CCD cameras 33 and 34 constituting the image pickup means for focus control, the CCD camera 33 at the front stage is referred to as a camera 1, and the CCD camera 34 at the rear stage is referred to as a camera 2.

In this example, a pathological sample of sarcomatoid carcinoma of the oral cavity is used as the sample S. This pathological sample is set in a microscope (NIKONTMD, 20 x, NA0.75), and a CCD camera (ORCA, produced by Hamamatsu Photonics K.K.) is disposed. In this example, in order to check the effect by using the two images in opposite directions with respect to the inclination direction, a single CCD camera is used and the focus measurement is twice carried out while varying the arrangement angle of the CCD camera at θ=±25°. At this time, both ends in the inclination direction of the image pickup face of CCD have a depth of approximately 3.7 mm in the optical axis direction. This is equivalent to about 9 μm in terms of the depth on the sample because variation in the optical axis direction on the sample S is equal to the square of magnification on the image pickup face.

In the images for focus control which are acquired by the two CCD cameras, the size of the measurement target image $X_1'$ and $X_2'$ was set to a×b'=1024 pixels×190 pixels, and the focus measurement was carried out for five points at which the deviation of the focus position from the correct focus position was −4 μm, −2 μm, 0 μm, 2 μm, and 4 μm.

Figure 8:
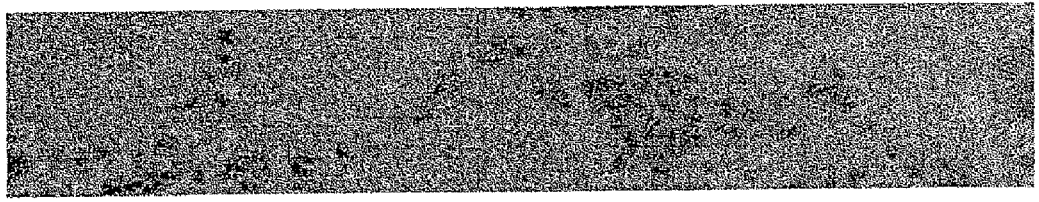
FIG. 8 is a figure including images showing examples of a measurement target image used for focus control.
Figure 8:
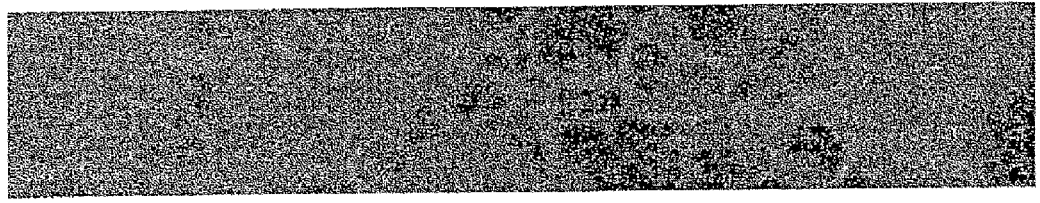
Figure 9:
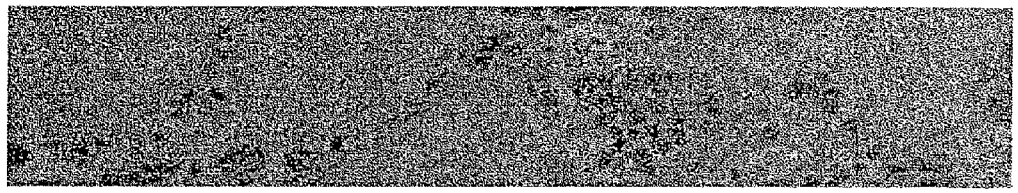
FIG. 9 is a figure including images showing examples of a measurement target image used for focus control.
Figure 9:
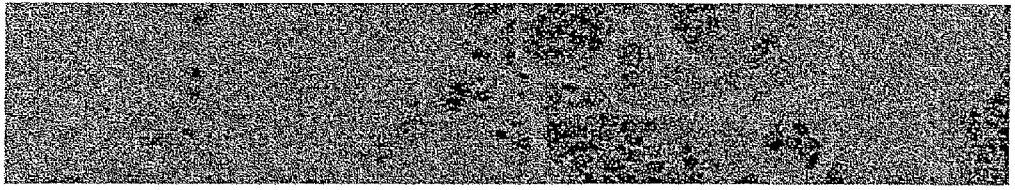

FIG. 8 to FIG. 12 show examples of measurement target images used for focus control. Here, the images (a) and (b) of FIG. 8 show (a) the measurement target image $X_1'$ of the camera 1 and (b) the measurement target image $X_2'$ of the camera 2 which are acquired when the deviation of the focus position is −4 μm. The images (a) and (b) of FIG. 9 show (a) the measurement target image $X_1'$ of the camera 1 and (b) the measurement target image $X_2'$ of the camera 2 which are acquired when the deviation of the focus position is −2 μm.

Figure 10:
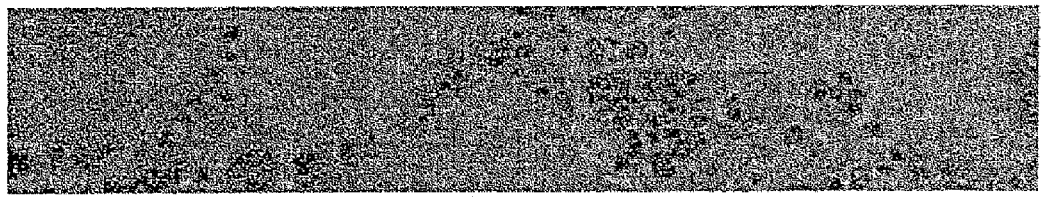
FIG. 10 is a figure including images showing examples of a measurement target image used for focus control.
Figure 10:
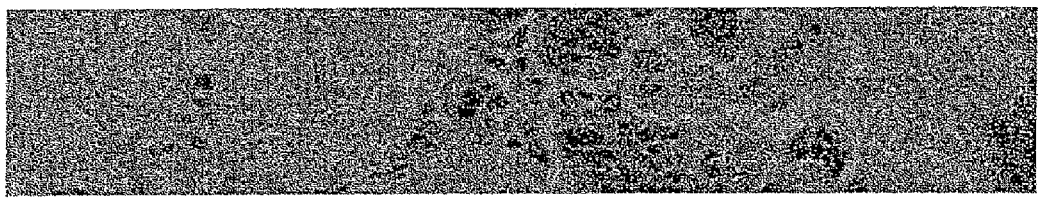
Figure 11:
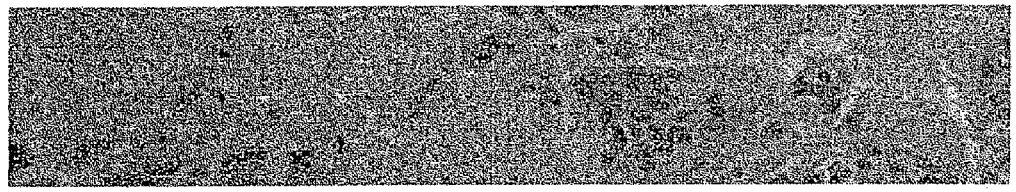
FIG. 11 is a figure including images showing examples of a measurement target image used for focus control.
Figure 11:
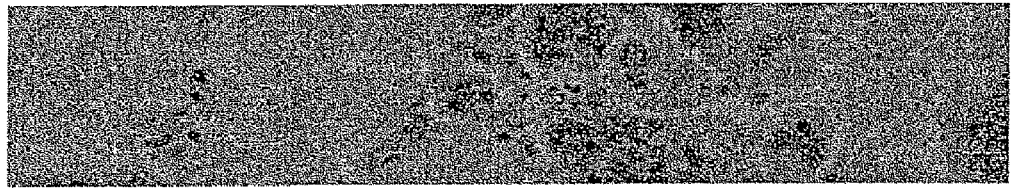
Figure 12:
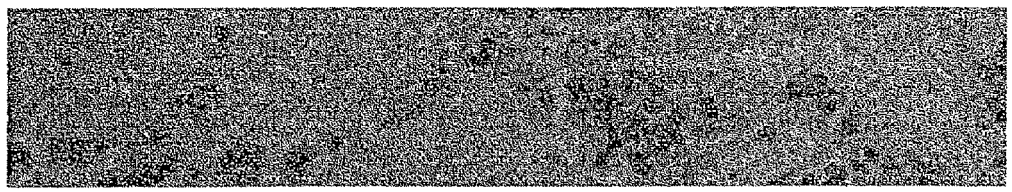
FIG. 12 is a figure including images showing examples of a measurement target image used for focus control.
Figure 12:
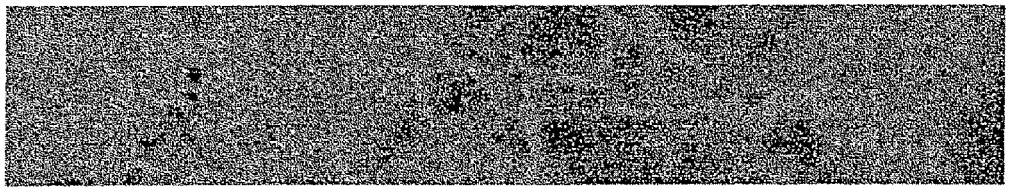

The images (a) and (b) of FIG. 10 show (a) the measurement target image $X_1'$ of the camera 1 and (b) the measurement target image $X_2'$ of the camera 2 which are acquired when the deviation of the focus position is 0 μm. The images (a) and (b) of FIG. 11 show (a) the measurement target image X1' of the camera and (b) the measurement target image $X_2'$ of the camera 2 which are acquired when the deviation of the focus position is 2 μm. The images (a) and (b) of FIG. 12 show (a) the measurement target image $X_1'$ of the camera 1 and (b) the measurement target image $X_2'$ of the camera 2 which are acquired when the deviation of the focus position is 4 μm.

Shift images $X_1''$ and $X_2''$ are created by shifting the two kinds of measurement target images $X_1'$ and $X_2'$ by four pixels, and the differential absolute value images $Y_1$ and $Y_2$ and the data arrays $Z_1$ and $Z_2$ are determined from the images X' and X". Then, the focal point center-of-gravity data F1, F2 corresponding to the sums $T_1$ and $T_2$ of the products of the addresses and the data in the data arrays $Z_1$ and $Z_2$ are determined. Furthermore, the difference F=F1−F2 between the focal point center-of-gravity data F1 and F2 (the difference $T=T_1-T_2$ between the sums $T_1$ and $T_2$) is calculated, and used for focus control.

Figure 13:
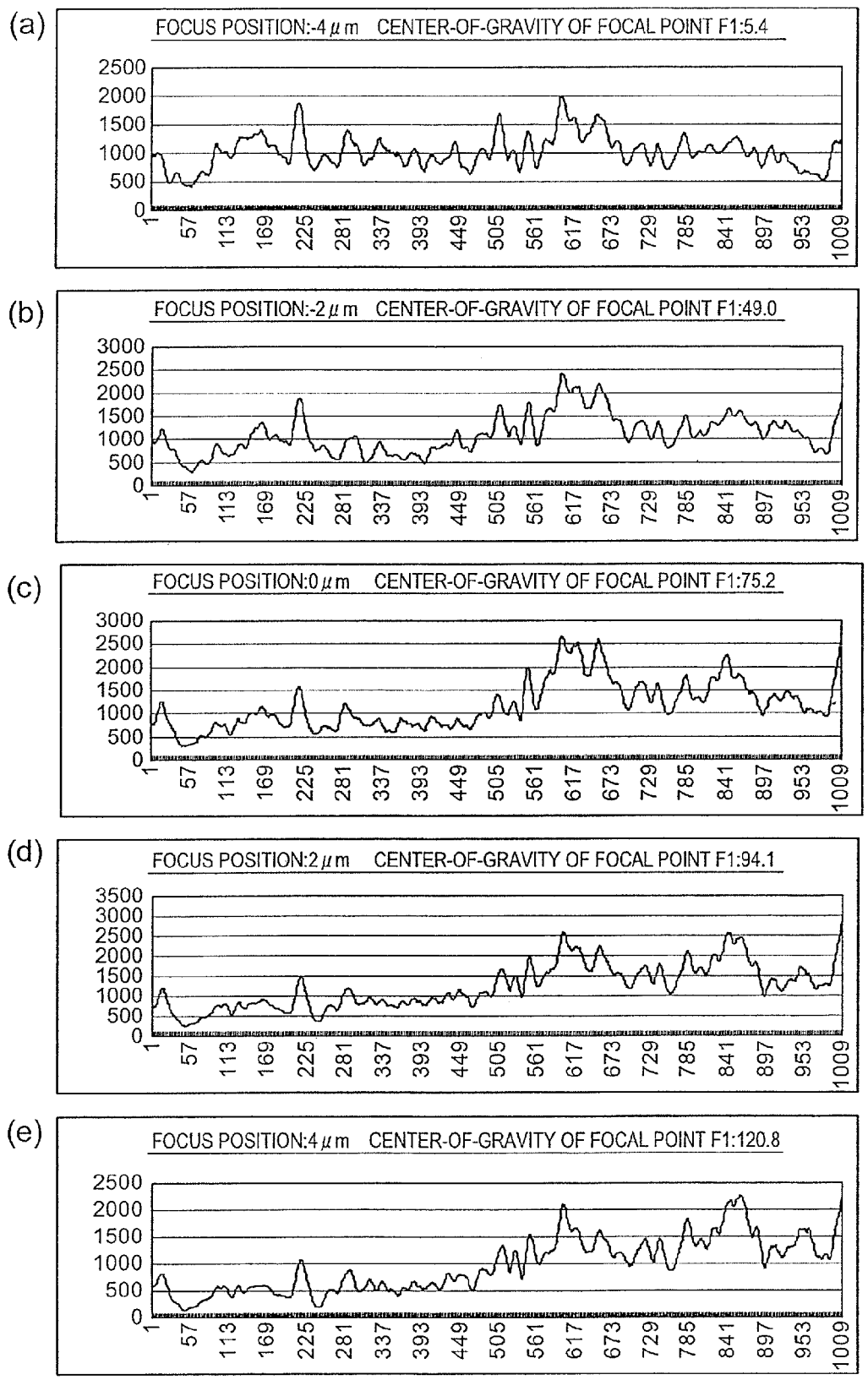
FIG. 13 is a figure including graphs showing contrast variations in the measurement target images shown in FIGS. 8 to 12.

FIG. 13 is a figure including graphs showing the contrast variations in the measurement target images $X_1$ of the camera 1 shown in images (a) of FIG. 8 to FIG. 12. In the graphs (a) to (e) of FIG. 13, the abscissa axis represents the pixel position in the inclination direction, and the ordinate axis represents the data array $Z_1$ corresponding to the contrast at each position. The graphs (a) to (e) of FIG. 13 correspond to the image (a) of FIG. 8, the image (a) of FIG. 9, the image (a) of FIG. 10, the image (a) of FIG. 11 and the image (a) of FIG. 12, respectively.

From the data arrays $Z_1$, the focal point center-of-gravity F1 (sum $T_1$) corresponding to each focus position is determined as (a) F1=5.4 for the focus position −4 μm, (b) F1=49.0 for the focus position −2 μm, (c) F1=75.2 for the focus position 0 μm, (d) F1=94.1 for the focus position 2 μm and (e) F1=120.8 for the focus position 4 μm. This result indicates that all the values of F1 are positive in the variation of the value of the focal point center-of-gravity F1 determined from the data array $Z_1$ with respect to the deviation of the focus position and there is no point at which a negative value is shifted to a positive value. The above variation of the value of the focal point center-of-gravity F1 is caused by variation of the contrast pattern of the sample S itself.

Figure 14:
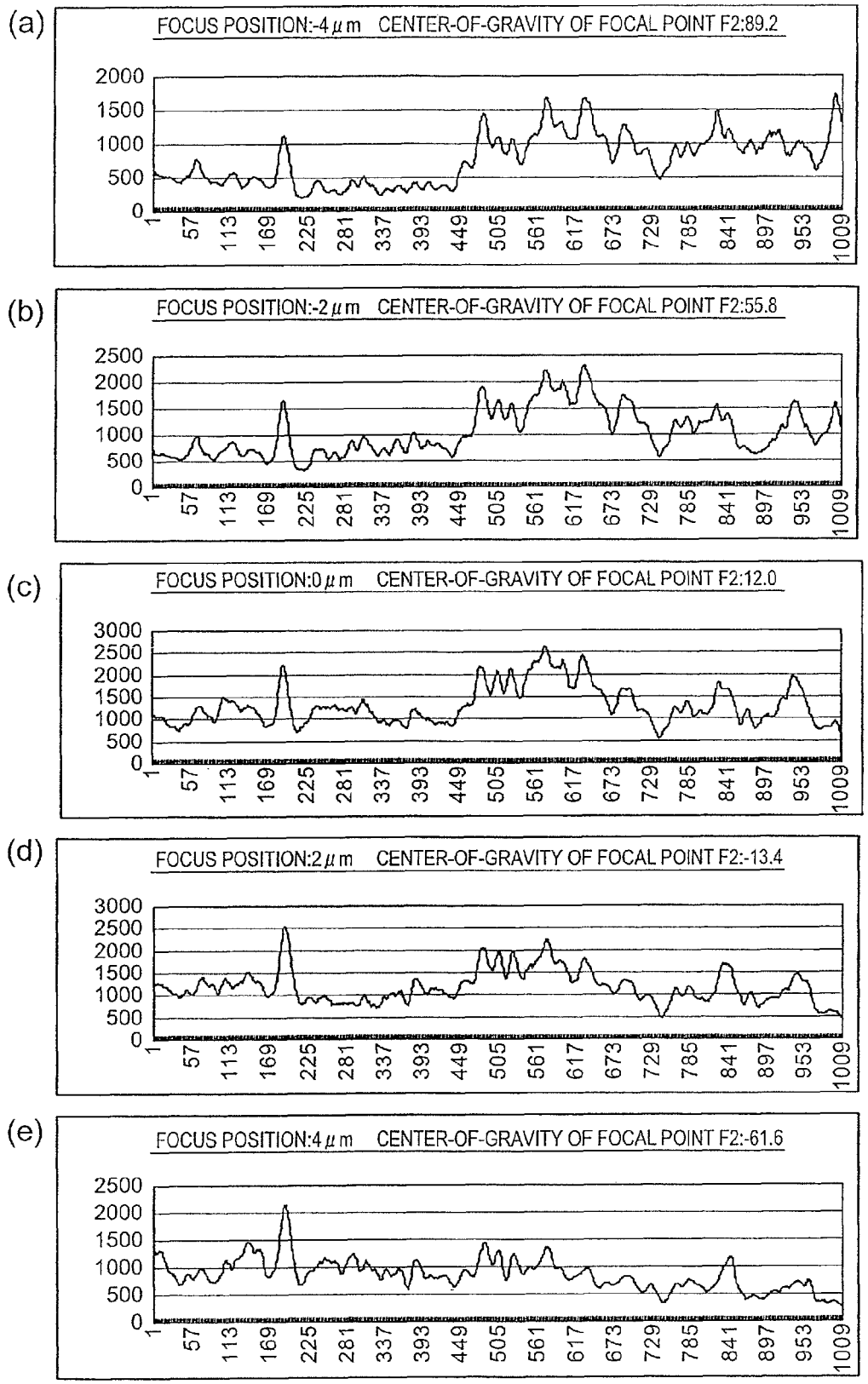
FIG. 14 is a figure including graphs showing contrast variations in the measurement target images shown in FIGS. 8 to 12.

FIG. 14 is a figure including graphs showing the contrast variations in the measurement target images $X_2$ of the camera 2 shown in images (b) of FIG. 8 to FIG. 12. In the graphs (a) to (e) of FIG. 14, the abscissa axis represents the pixel position in the inclination direction, and the ordinate axis represents the data array $Z_2$ corresponding to the contrast at each position. The graphs (a) to (e) of FIG. 14 correspond to the image (b) of FIG. 8, the image (b) of FIG. 9, the image (b) of FIG. 10, the image (b) of FIG. 11 and the image (b) of FIG. 12, respectively.

From these data arrays $Z_2$, the focal point center-of-gravity F2 (sum $T_2$) corresponding to each focus position is determined as (a) F2=89.2 for the focus position −4 μm, (b) F2=55.8 for the focus position −2 μm, (c) F2=12.0 for the focus position 0 μm, (d) F2=−13.4 for the focus position 2 μm and (e) F2=−61.6 for the focus position 4 μm, respectively.

Furthermore, from these focal point center-of-gravity data F1 and F2, the difference F of the focal point center-of-gravity data (the difference T of the sums) is calculated as (a) F=−83.8 for the focus position −4 μm, (b) F=−6.8 for the focus position −2 μm, (c) F=63.2 for the focus position 0 μm, (d) F=107.5 for the focus position 2 μm and (e) F=182.4 for the focus position 4 μm. From the analysis result acquired by analyzing the images acquired by the two cameras inclined in opposite directions with respect to the optical axis as described above, it is apparent that the deviation of the focus position and the variation of the value of the difference F in focal point center-of-gravity determined from the data arrays $Z_1$ and $Z_2$ are well associated with each other irrespective of the contrast pattern owned by the sample S itself. Accordingly, by referring to such an analysis result, focus control information for image pickup can be suitably acquired.

The microscope system according to the present invention will be further described.

Figure 15:
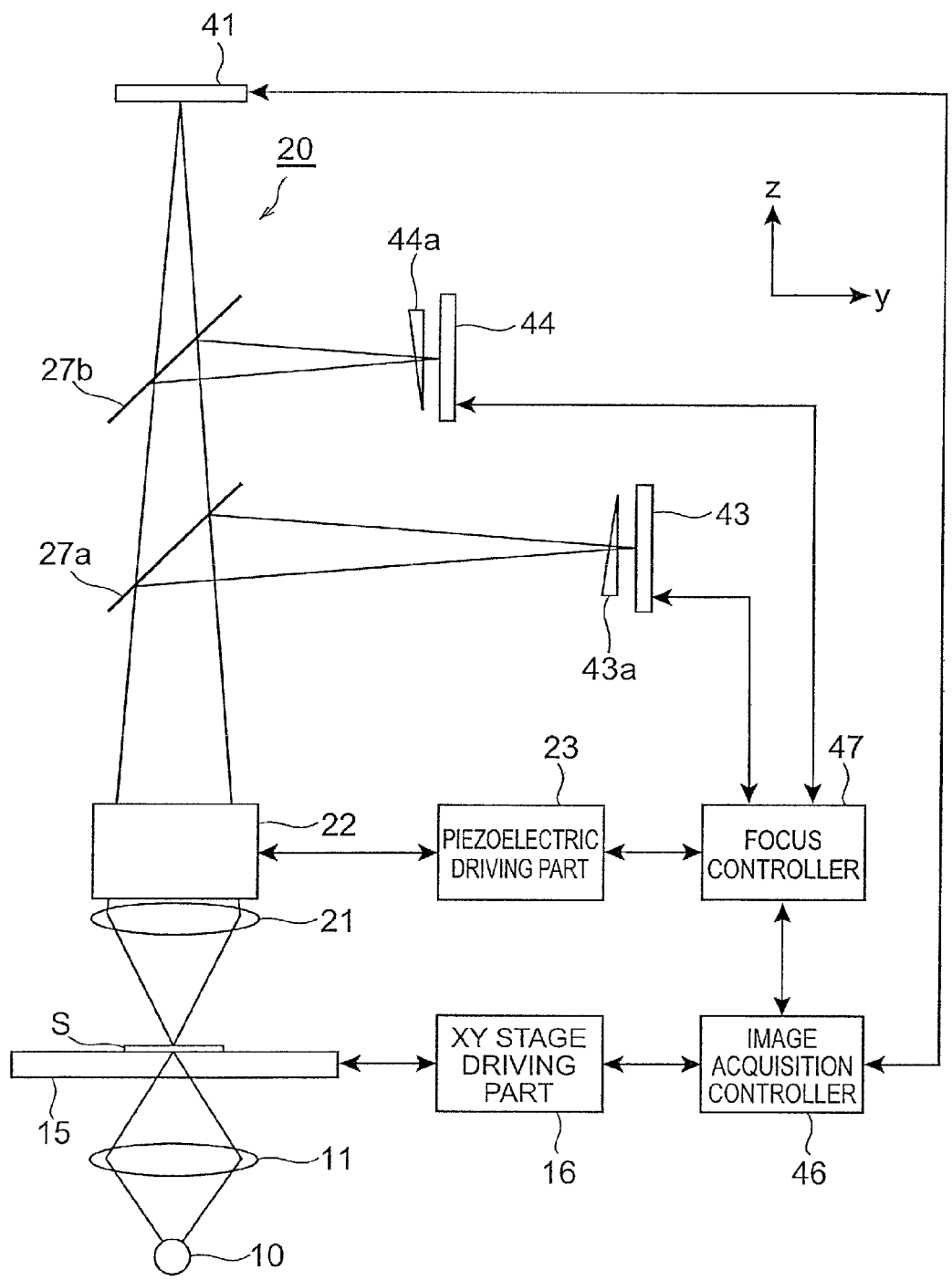
FIG. 15 is a block diagram showing the construction of a second embodiment of a microscope system.

FIG. 15 is a block diagram showing the construction of a second embodiment of the microscope system of the present invention. In this embodiment, the irradiation light source 10, the light converging lens 11, the sample stage 15, the XY stage driving part 16, the light guiding optical system 20, the piezoelectric actuator 22 and the piezoelectric driving part 23 are the same as those of the embodiment shown in FIG. 1.

A photodetector 41 is disposed on the image acquisition optical path at a position corresponding to the image forming plane of an optical image of the sample S which passes through the beam splitters 27a and 27b. The photodetector 41 serves as image acquisition image pickup means used to acquire an image based on the optical image split to the image acquisition optical path by the beam splitters 27a and 27b. As the photodetector 41, specifically a linear sensor for acquiring a one-dimensional image of the sample S or an image sensor which can acquire a two-dimensional image may be used.

On the other hand, on the focus control optical path at the front stage, an image pickup device 43 is disposed, at the position corresponding to the image forming plane of the optical image of the sample S which is reflected by the beam splitter 27a. Furthermore, on the focus control optical path at the rear stage, an image pickup device 44 is disposed at the position corresponding to the image forming plane of the optical image of the sample S which is reflected by the beam splitter 27b. Each of the image pickup devices 43 and 44 comprises a CCD camera which can acquire a two-dimensional image.

The CCD cameras 43 and 44 are first and second image pickup means for acquiring images based on an optical image which is split by the beam splitters 27a and 27b, and these cameras 43 and 44 constitute the focus control image pickup means of this embodiment. That is, in the microscope system shown in FIG. 15, focus control information when the image of the sample S is picked up by the photodetector 41 is acquired by using the two-dimensional images of the sample S acquired by the CCD cameras 43 and 44, and also focus control is carried out on the basis of the focus control information thus acquired.

Specifically, the CCD camera 43 serving as the first image pickup means of the focus control image pickup means is disposed so that the image pickup face thereof is substantially coincident with the xz-plane perpendicular to the optical path. Furthermore, an optical path length changing member 43*a* is disposed at a predetermined position with respect to the image pickup face between the beam splitter 27*a* and the camera 43. The optical path length changing member 43*a* is formed of light transmissible material transmitting light from the sample S therethrough and designed to have a wedge shape for which the thickness thereof varies along the z-axis direction. At this time, within the image pickup face of the CCD camera 43, the optical path length in the light guiding optical system 20 over which light is guided from the sample S to the camera 43 varies along the z-axis direction of the variation direction.

The CCD camera 44 serving as the second image pickup means of the focus control image pickup means is disposed so that the image pickup face thereof is substantially coincident with the xz-plane perpendicular to the optical path. Furthermore, an optical path length changing member 44*a* is disposed at a predetermined position with respect to the image pickup face between the beam splitter 27*b* and the camera 44. The optical path length changing member 44*a* is formed of light transmissible material transmitting light from the sample S therethrough and designed to have a wedge shape so that the thickness thereof varies along the z-axis direction and in the opposite direction to the optical path length changing member 43*a*. At this time, within the image pickup face of the CCD camera 44, the optical path length in the light guiding optical system 20 over which light is guided from the sample S to the camera 44 varies along the z-axis direction of the variation direction and in the opposite direction to the camera 43.

An image acquisition controller 46 and a focus controller 47 are equipped for the sample stage 15, the light guiding optical system 20 the photodetector 41 and the CCD cameras 43 and 44. The image acquisition controller 46 serves as control means for controlling the image acquiring operation of the sample S by acquiring of the image of the sample S and controlling the setting of the image pickup position to the sample S. Specifically, the image acquisition controller 46 controls the acquisition of the image by the photodetector 41. The controller 46 controls the driving of the sample stage 15 through the XY stage driving part 16 to set or vary the image pickup position on the optical axis of the microscope optical system for the sample S mounted on the sample stage 15.

Focus controller 47 analyzes the image acquired by the CCD cameras 43 and 44 according to a predetermined analysis method, and acquires the focus control information for the image pickup of the sample S by the photodetector 41 on the basis of the analysis result. Furthermore, the focal point for the image pickup by the photodetector 41 is controlled by the focus controller 47 on the basis of the focus control information thus acquired. In this embodiment, focus controller 47 controls the driving of the piezoelectric actuator 22 through the piezoelectric driving part 23 to adjust the position of the objective lens 21 in the z-axis direction, thereby performing the image pickup focus control.

Here, the optical path length changing members 43*a* and 44*a* which are designed to be a wedge shape are disposed at the front side of the CCD cameras 43 and 44, serving as the focus control image pickup means, with respect to the optical axis of the respective focus control optical paths as described above. Therefore, the respective two-dimensional images acquired by the CCD cameras 43 and 44 becomes an image in which the deviation from the focus position varies along the z-axis direction as in the case of the construction shown in FIG. 1 in which the CCD cameras and 34 is disposed being inclined. Focus control information such as the deviation of the image pickup focal point, the necessity or non-necessity of the focusing, the correction amount required to match the focal point, etc., can be acquired by analyzing in focus controller 47 the image in which the deviation from the focus position varies along a predetermined variation direction as described above. Furthermore, with respect to the images acquired by the cameras 43 and 44, the direction along which the deviation from the focus position varies is opposite between these images. By using the two kinds of images as described above, the focus control information can be acquired with high precision.

The effect of the microscope system according to this embodiment will be described.

In the microscope system shown in FIG. 15, the CCD cameras 43 and 44 which can acquire two-dimensional images are used as the image pickup means used for focus control for the sample S targeted to acquire images, and also the cameras 43 and 44 are disposed so as to satisfy the image pickup condition where the optical path length over which an optical image is guided from the sample S varies in a predetermined direction. According to the construction where the two-dimensional images acquired by using the cameras 43 and 44 as described above are analyzed to carry out focus control, irradiation of a focus measuring laser beam to a sample, etc., are not required. Accordingly, the apparatus construction and the image pickup operation can be simplified as a whole of the microscope system containing the focus measurement part.

Furthermore, in the apparatus described above, the focus control image pickup means is constructed by the CCD camera 43 serving as the first image pickup means and the CCD camera 44 serving as the second image pickup means which are designed so that the optical path lengths thereof vary along a predetermined variation direction in opposite directions to each other. By carrying out the focus measurement with the two kinds of images acquired by these image pickup means, the focus control information when images of the sample S are acquired by the photodetector 41 serving as the image acquisition image pickup means can be acquired with high precision. By using the focus control information thus acquired, focus control can be suitably performed when images of the sample S are acquired.

Specifically, in the above construction, the two CCD cameras 43 and 44 having the optical path length changing members 43*a* and 44*a* disposed so that the optical path lengths thereof vary in opposite directions to each other with the z-axis direction set as the variation direction are used to acquire the focus control information. By carrying out the focus measurement with the two image pickup devices in which the optical path lengths thereof vary in opposite directions as described above, even when the contrast pattern of the sample S itself is non-uniform, the effect can be suppressed, and focus control can be suitably performed.

As compared with the construction of FIG. 1 in which the image pickup device used for focus control is disposed being inclined with respect to the optical axis, the construction of this embodiment carries out the focus measurement by combining the image pickup device and the optical path length changing member. The construction as described above can also suitably implement the image pickup focus control. In general, the first and second image pickup means constituting the focus control image pickup means may be constructed and arranged on the respective optical paths so that the optical path length in the light guiding optical system varies along a predetermined variation direction within the image pickup face.

Particularly in the construction using the optical path length changing member, it is unnecessary to dispose the image pickup device being inclined, and thus there is an advantage that it can be easily mounted on the microscope. Furthermore, there is a case where a fixed pattern noise caused by non-uniformity of pixels is remarkable when light is obliquely made incident to the image pickup face of the CCD camera. However, such a noise problem does not occur in the construction where the image pickup device is disposed vertically to the optical axis.

Since the variation in the optical axis direction on the sample S is equal to the square of magnification on the image pickup face, a focus position controllable range is limited in the construction where the image pickup device is inclined. On the other hand, in the construction where the optical path length changing member is used, the shape of the optical path length changing member can be selected in conformity with the focus position range to be controlled. The difference $\Delta x$ in the optical path length (optical distance) when the optical path length changing member is used as described above is calculated from the thickness d and the refractive index n of the glass or the like of the changing member according to $\Delta x = d(n-1)/n$.

Furthermore, in this embodiment, the CCD cameras 43 and 44 constituting the focus control image pickup means are designed so that the optical path lengths vary along the predetermined variation direction in opposite directions to each other as described above, whereby the precision of the focus control information acquired can be enhanced. The first image pickup means and the second image pickup means of the focus control image pickup means may be generally designed so that the optical path lengths thereof vary along the predetermined variation direction at different variation rates. As such a construction, for example, a construction may be used where the optical path lengths vary in the same direction, but at different variation rates.

Figure 16:
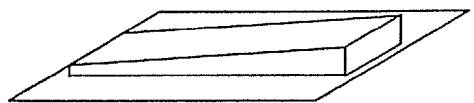
FIG. 16 is a figure including perspective views showing examples of the construction of an optical path length changing member.
Figure 16:
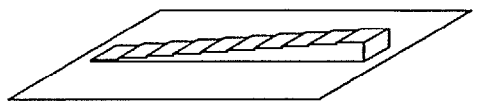
Figure 16:
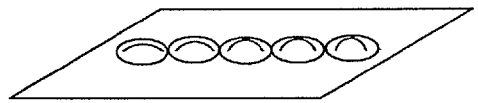
Figure 16:
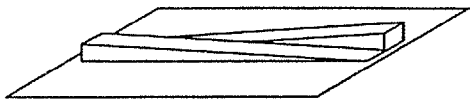
Figure 16:
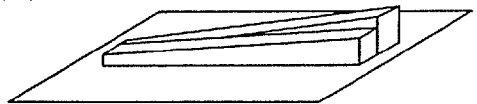
Figure 16:
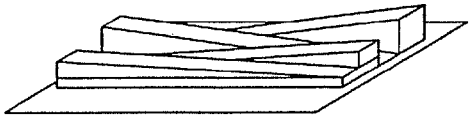

With respect to the optical path length changing member disposed at the front side of the image pickup device for focus control, various shapes may be used as shown in construction examples (a) to (f) of FIG. 16. Of these optical path length changing members shown in FIG. 16, the construction example (a) of FIG. 16 corresponds to a wedge shape in which the thickness continuously varies along the variation direction of the optical path length described above with reference to FIG. 15. The construction example (b) of FIG. 16 corresponds to a step wedge shape in which the thickness varies stepwise. In the construction example (c) of FIG. 16, a lens array in which a plurality of micro lenses different in focus distance are arranged along the variation direction is used as the optical path length changing member.

In the construction examples (d) to (f) of FIG. 16, optical path length changing members having a plurality of wedge shapes which are different in thickness variation amount or variation direction (variation rate of thickness) are used in combination. By using the plurality of types of members, the focus measurement can be performed under various conditions. For example, according to the construction using a wedge member having a small wedge slope corresponding to a thickness variation rate and a wedge member having a large wedge slope in combination as shown in the construction example (e) of FIG. 16, the measurement range of the focus measurement and the resolution can be selected in accordance with the slope of the wedge to carry out focus control with high precision.

In this case, for example, the following focus control methods can be used. First, the focus position is measured by using the large-slope wedge member to adjust the focus position with low precision. Subsequently, the focus position is adjusted with high precision by using the small-slope wedge member. According to the control method as described above, the setting of the focus position can be quickly and simply performed at the start time of the image acquiring operation.

Alternatively, the focus position is adjusted by the small-slope wedge member during the image acquiring operation. When the focus position is not measured, the focus position is measured by using the large-slope wedge member, and the focus position is adjusted with low precision. Furthermore, the focus position is adjusted with high precision by using the small-slope wedge member again. According to the control method as described above, focus control can be suitably implemented even in a case where a sample targeted to acquire images is a sample having a large thickness variation.

When the microscope is designed so that the magnification thereof can be set to a plurality of values, it is preferable to provide wedge members having slopes corresponding to the plurality of magnifications. In this case, even when the magnification of the microscope is changed, the microscope system can be designed so that it is unnecessary to optically and mechanically change the focus measurement part.

In the construction using the optical path length changing member, the changing member may be directly fixed to the image pickup device being brought into close contact with the image pickup device or disposed so as to be spaced from the image pickup device at some distance. Furthermore, an optical element other than the optical path length changing member through which light passes may be used as the optical path length changing means. In the microscope system shown in FIG. 15, the specific focus control method is also the same as the microscope system shown in FIG. 1.

The construction where the optical path length varies by disposing the optical path length changing member at the front side of the image pickup device is not limited to the construction using the two image pickup devices shown in FIG. 15, but it may be applied to a construction where the two types of optical path length changing members whose thickness variation directions are opposite each other as shown in a construction example (d) of FIG. 16 are equipped to one image pickup device. In this case, the focus control image pickup means is constructed by using a single image pickup device, whereby the construction of the microscope system can be simplified.

That is, the first image pickup means constituting the focus control image pickup means is constructed by using first optical path length changing means which is disposed at a predetermined position with respect to the first image pickup area of the image pickup face of the image pickup device so that the optical path length thereof varies along a predetermined variation direction. The second image pickup means constituting the focus control image pickup means is constructed by using second optical path length changing means which is disposed at a predetermined position with respect to the second image pickup area of the image pickup face of the image pickup device so that the optical path length thereof varies along the above variation direction at a different variation rate from the first optical path length changing means, preferably the optical path length varies in the opposite direction from the first optical path length changing means. By constructing the microscope system as described above, the same focus control as the construction shown in FIG. 15 can be performed.

Furthermore, in each embodiment described above, the beam splitter serving as the optical splitting means is disposed in the light guiding optical system 20, and the image acquisition image pickup means and the focus control image pickup means are disposed in the image acquisition optical path and the focus control optical path to which the light is split by the beam splitter. On the other hand, it may be possible that the optical splitting means is not disposed in the light guiding optical system 20, but the same optical path is used as the image acquisition optical path and the focus control optical path.

In this case, the same image pickup device may be used as the image acquisition image pickup means and the focus control image pickup means. In general, the image acquisition image pickup means may be constructed by one image pickup device contained in the focus control image pickup means.

Figure 17:
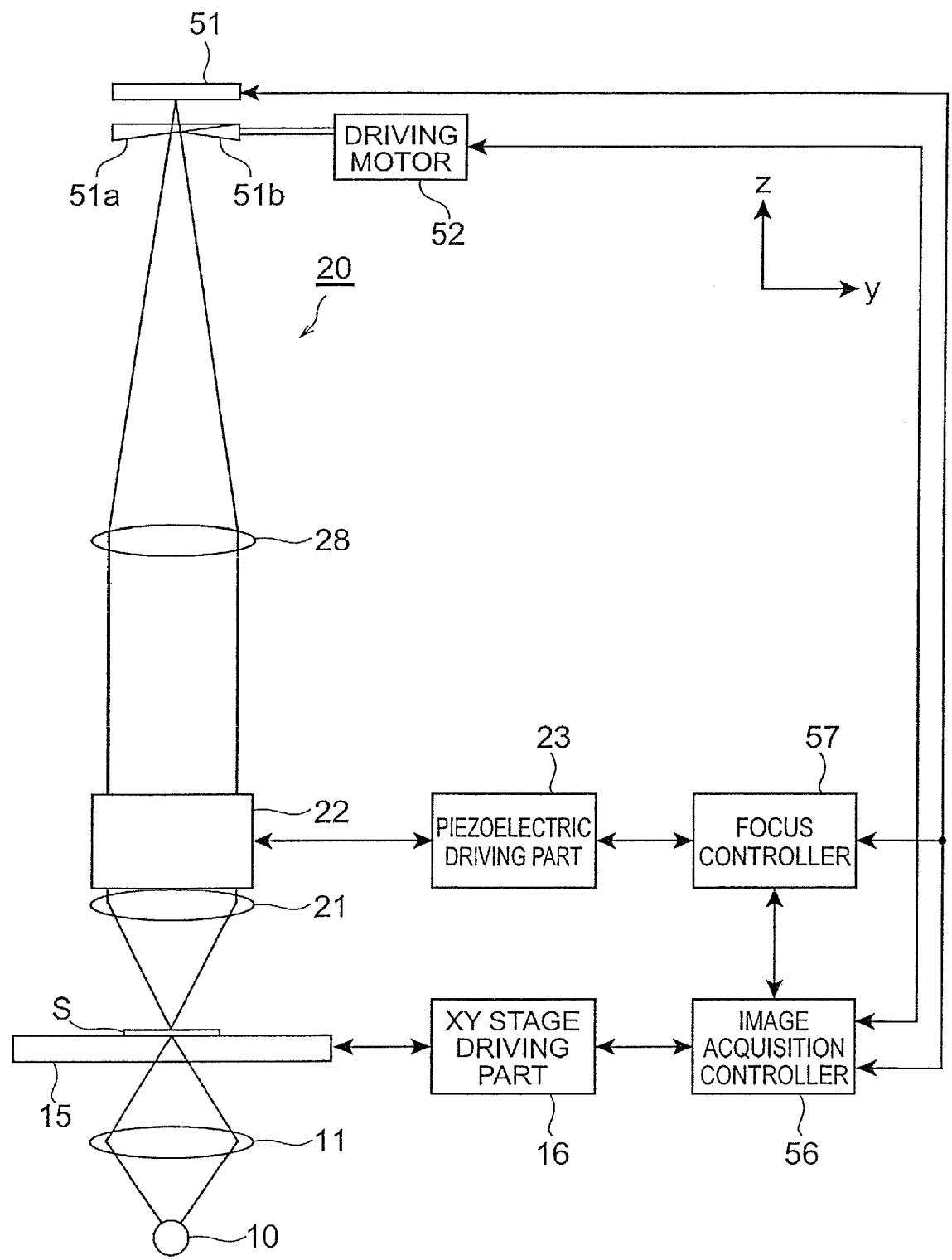
FIG. 17 is a block diagram showing the construction of a third embodiment of a microscope system.

FIG. 17 is a block diagram showing the construction of a third embodiment of the microscope system of the present invention. In this embodiment, the irradiation light source 10, the light converging lens 11, the sample stage 15 and the XY stage driving part 16 are constructed in the same structure as shown in FIG. 1.

The light guiding optical system 20 is equipped at the upper side of the sample stage 15 with respect to the sample S. In this embodiment, the light guiding optical system 20 has an objective lens 21 and image forming lens 28 disposed at the rear stage of the objective lens 21. In FIG. 17, an optical path along which light from the objective lens 21 is passed through the image forming lens 28 and an image of the light is formed is commonly used as an image acquisition optical path used for acquiring images of the sample S and a focus control optical path used to carry out focus control when the image of the sample S is picked up.

The objective lens 21 is provided with a piezoelectric actuator 22 for driving the objective lens 21 in the z-axis direction. The driving of the piezoelectric actuator 22 is controlled by a piezoelectric driving part 23. In the microscope system of this embodiment, the position of the objective lens 21 in the z-axis direction varies by using the piezoelectric actuator 22, whereby the focal point for image pickup can be adjusted when images of the sample S are acquired.

On the optical path commonly used as the image acquisition optical path and the focus control optical path, an image pickup device 51 is disposed at the position corresponding to the image forming plane of the optical image of the sample S which is passed through the image forming lens 28. The image pickup device 51 comprises a CCD camera which can acquire two-dimensional images. In this embodiment, the image acquisition image pickup means used to acquire images of the sample S and the focus control image pickup means used for focus control are constructed by the camera 51. That is, in the microscope system shown in FIG. 17, focus control information when the image of the sample S is picked up is acquired by using the two-dimensional image of the sample S acquired by the camera 51 and focus control is carried out on the basis of the acquired focus control information.

Specifically, the CCD camera 51 is disposed so that the image pickup face thereof is substantially coincident with the xy-plane perpendicular to the optical path. Two image pickup areas of a first image pickup area and a second image pickup area are set in the x-axis direction on the image pickup face. A first optical path length changing member 51a having a wedge shape in which the thickness varies along the y-axis direction is disposed at a predetermined position with respect to the first image pickup area, thereby constructing the first image pickup means of the focus control image pickup means. At this time, within the first image pickup area of the image pickup face of the camera 51, the optical path length in the light guiding optical system 20 over which light from the sample S is guided to the camera 51 varies along the y-axis direction with the y-axis direction set as the variation direction.

Furthermore, a second optical path length changing member 51b having a wedge shape of which the thickness varies along the y-axis direction in the opposite direction to the first optical path length changing member 51a is disposed at a predetermined position with respect to the second image pickup area of the camera 51, thereby constructing the second image pickup means of the focusing control image pickup means. At this time, within the second image pickup area of the image pickup face of the camera 51, the optical path length in the light guiding optical system 20 over which light from the sample S is guided to the camera 51 varies along the y-axis direction in the opposite direction to the first image pickup area along the y-axis direction as the variation direction.

A driving motor 52 is provided for the optical path length changing members 51a and 51b disposed at the front side of the CCD camera 51. The driving motor 52 serves as driving means for driving the optical path length changing members 51a and 51b between a position on the optical path and a position out of the optical path with respect to the image pickup face of the camera 51. Under the state where the optical path length changing members 51a and 51b are disposed on the optical path by the driving motor 52, the camera 51 functions as the focus control image pickup means. On the other hand, in a state where the optical path length changing members 51a and 51b are out of the optical path by the driving motor 52, the camera 51 functions as the image acquisition image pickup means. FIG. 17 shows a state where the optical path length changing members 51a and 51b are disposed on the optical path.

An image acquisition controller 56 and a focus controller 57 are provided for the sample stage 15, the light guiding optical system 20, the CCD camera and the driving motor 52. The image acquisition controller 56 controls the acquisition of images of the sample S and the setting of the image pickup position to the sample S. In this embodiment, the image acquisition controller 56 controls the driving of the optical path length changing members 51a and 51b by the driving motor 52, thereby switching the mode to a focus measurement mode in which the optical path length changing members 51a and 51b are disposed on the optical path or an image acquisition mode in which the optical path length changing members 51a and 51b are out of the optical path.

The focus controller 57 analyzes the image acquired by the CCD camera 51 according to a predetermined analysis method in a state where the changing members 51a and 51b are disposed on the optical path. On the basis of the analysis result, focus control information when the image of the sample S is picked up by the camera 51 is acquired in a state where the changing members 51a and 51b are disposed out of the optical path. Or, furthermore, the focus controller 57 controls the focal point of the image pickup by the camera 51 on the basis of the focus control information thus acquired.

Here, the optical path length changing members 51a and 51b each having the wedge shape as described above are disposed with the first and second image pickup areas of the camera 51. Therefore, two-dimensional images acquired in the first and second image pickup areas of the camera 51 become images in which the deviation from the focus position varies along the y-axis direction as in the case of the constructions shown in FIG. 1 and FIG. 15. The images in which the deviation from the focus position varies along a predetermined variation direction as described above are analyzed in the focus controller 57, thereby acquiring the focus control information on the deviation of the focal point for image pickup, necessity or non-necessity of focus adjustment, a correction amount required to match the focal point, etc. Furthermore, the direction in which the deviation from the focal point varies is opposite between the images acquired by the first and second image pickup areas of the camera 51. By using the two kinds of images as described above, the focus control information can be acquired with high precision.

Effects of the microscope system according to this embodiment will be described.

In the microscope system shown in FIG. 17, for the sample S targeted to acquire images, the first and second image pickup areas of the camera 51 which can acquire two-dimensional images are used as the image pickup means for focus control, and the optical path length changing members 51a and 51b are equipped to the image pickup areas so as to satisfy the image pickup condition where the optical path length over which light from the sample S is guided varies in a predetermined direction. According to the construction where focus control is carried out by analyzing two-dimensional images acquired by the camera 51 as described above, irradiation of a focus measuring laser beam to a sample, etc., are not required. Accordingly, the apparatus construction and the image pickup operation can be simplified as a whole of the microscope system containing the focus measurement part.

Furthermore, in the above apparatus, the focus control image pickup means is constructed by the CCD camera 51 in which the two image pickup areas of the first and second image areas are set. By carrying out the focus measurement with the two kinds of images acquired by the image pickup areas as described above, focus control information when the image of the sample S is picked up can be acquired with high precision. Furthermore, by using the focus control information thus acquired, the focus control can be suitably performed when images of the sample S are acquired.

Furthermore, in the above construction, the single CCD camera 51 is commonly used as both the image acquisition image pickup means and the focus control image pickup means. According to the construction as described above, the construction of the microscope system can be further simplified as compared with the construction where image pickup devices are separately equipped.

Figure 18:
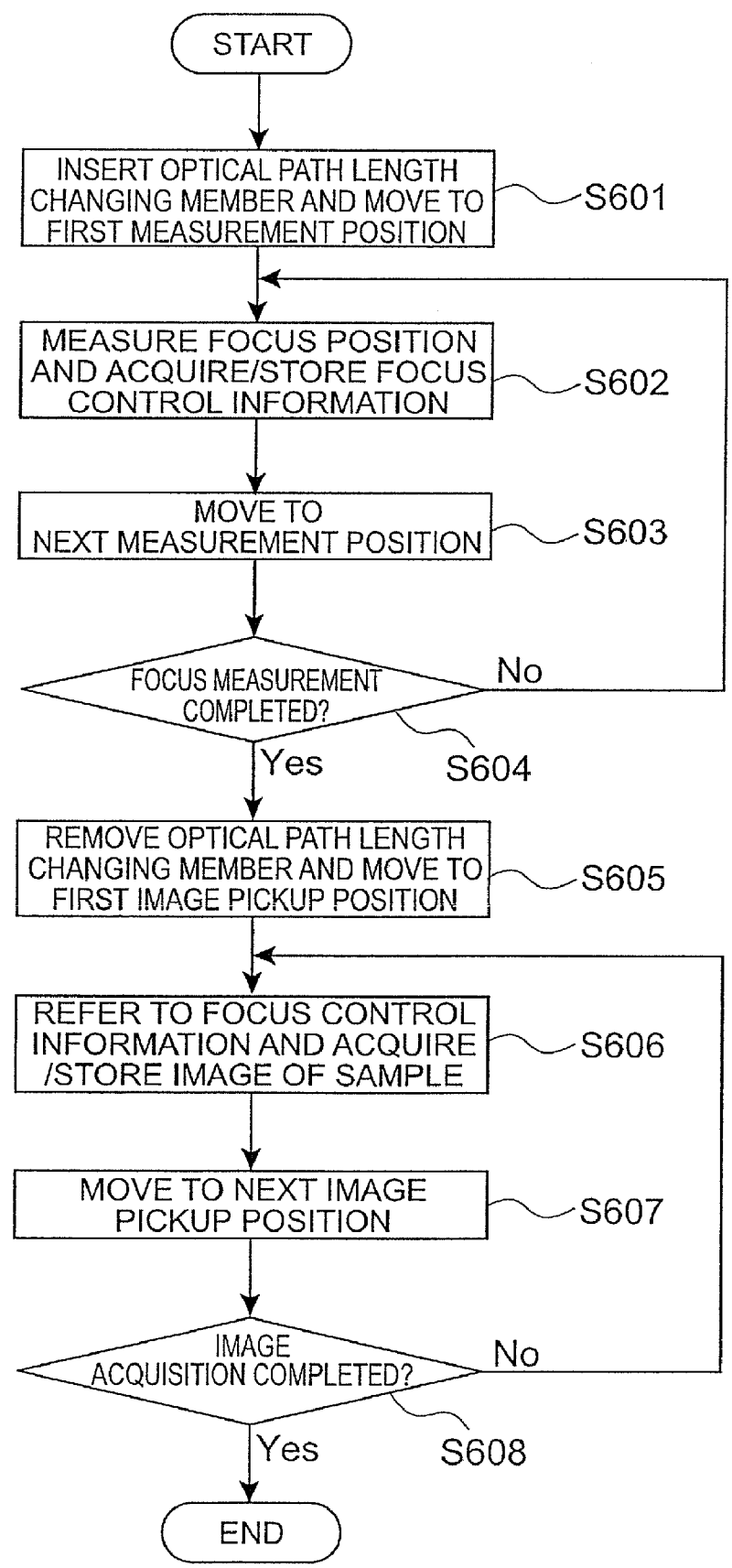
FIG. 18 is a flowchart showing an example of a focus control method.

A focus control method of the microscope system shown in FIG. 17 will be described. FIG. 18 is a flowchart showing an example of the focus control method. The focus control, the driving of the optical path length changing member, and the image acquisition of the sample described below are carried out by the image acquisition controller 56 and the focus controller 57 in the construction shown in FIG. 17. A specific analyzing method of images in the focus control are the same as the focus control method shown in FIG. 3 to FIG. 5.

First, the optical path length changing members 51a and 51b are driven by the driving motor 52 with respect to the CCD camera 51, to insert the changing members 51a and 51b on the optical path, thereby setting the system to the focus measurement mode for acquiring focus control information. Furthermore, the sample stage 15 is driven by the XY stage driving part 16 to move the sample S so that a first measurement position is set to a measurement position on the optical axis of the microscope optical system including the irradiation light source 10 and the objective lens 21 (step S601).

Subsequently, with respect to the measurement position thus set, the image acquired by the camera 51 is analyzed to measure the focus position, and the focus control information thus acquired is stored (S602). After the focus control information is acquired, the sample S is moved so that the measurement position on the optical axis is set to a next measurement position (S603). It is judged for all the measurement positions whether the focus measurement has been completed (S604). If it has not yet been completed, the steps S602 and S603 of the focus measurement are repeated. If the focus measurement has been completed, the focus measuring work is finished.

Subsequently, the optical path length changing members 51a and 51b are driven by the driving motor 52 to remove the changing members 51a and 51b out of the optical path, thereby setting the system to the image acquisition mode for the image acquisition of the sample S. Furthermore, the sample stage 15 is driven by the XY stage driving part 16 to move the sample S so that the measurement position on the optical axis is set to a first image pickup position (S605).

Subsequently, focus control is carried out on the set image pickup position by referring to the focus control information acquired previously, and an image of the sample S is acquired by the camera 51 and stored (S606). After the image acquisition is finished, the sample S is moved so that the image pickup position on the optical axis is set to a next image pickup position (S607). It is judged for all the image pickup positions whether the image acquisition of the sample S has been completed (S608), and if it has not yet been completed, the steps S606 and S607 for the image acquisition are repeated. On the other hand, if the image acquisition has been completed, the image acquiring work is finished.

According to the focus control method as described above, the image acquisition of the sample S and the focus control for image pickup can be suitably performed in the microscope system having the construction shown in FIG. 17. In the above-described method, the image pickup position of the sample S which is set at the image acquisition time is preferably set to the same position as the measurement position at the focus measurement time, for application of the focus control information. In the above-described method, the image acquisition is carried out after the focus measurement on the overall sample S has been completed. However, it may be modified so that the sample S is divided into a plurality of areas and the focus measurement and the image acquisition are alternatively carried out for every area. Alternatively, it may be modified so that the focus measurement is carried out on a plurality of image pickup areas selected suitably on the sample S, and focus control information on image pickup areas on which the focus measurement has not yet been carried out is subjected to interpolation processing by using the plurality of focus control information thus acquired, thereby creating a focus control information map on all the image pickup areas.

Figure 19:
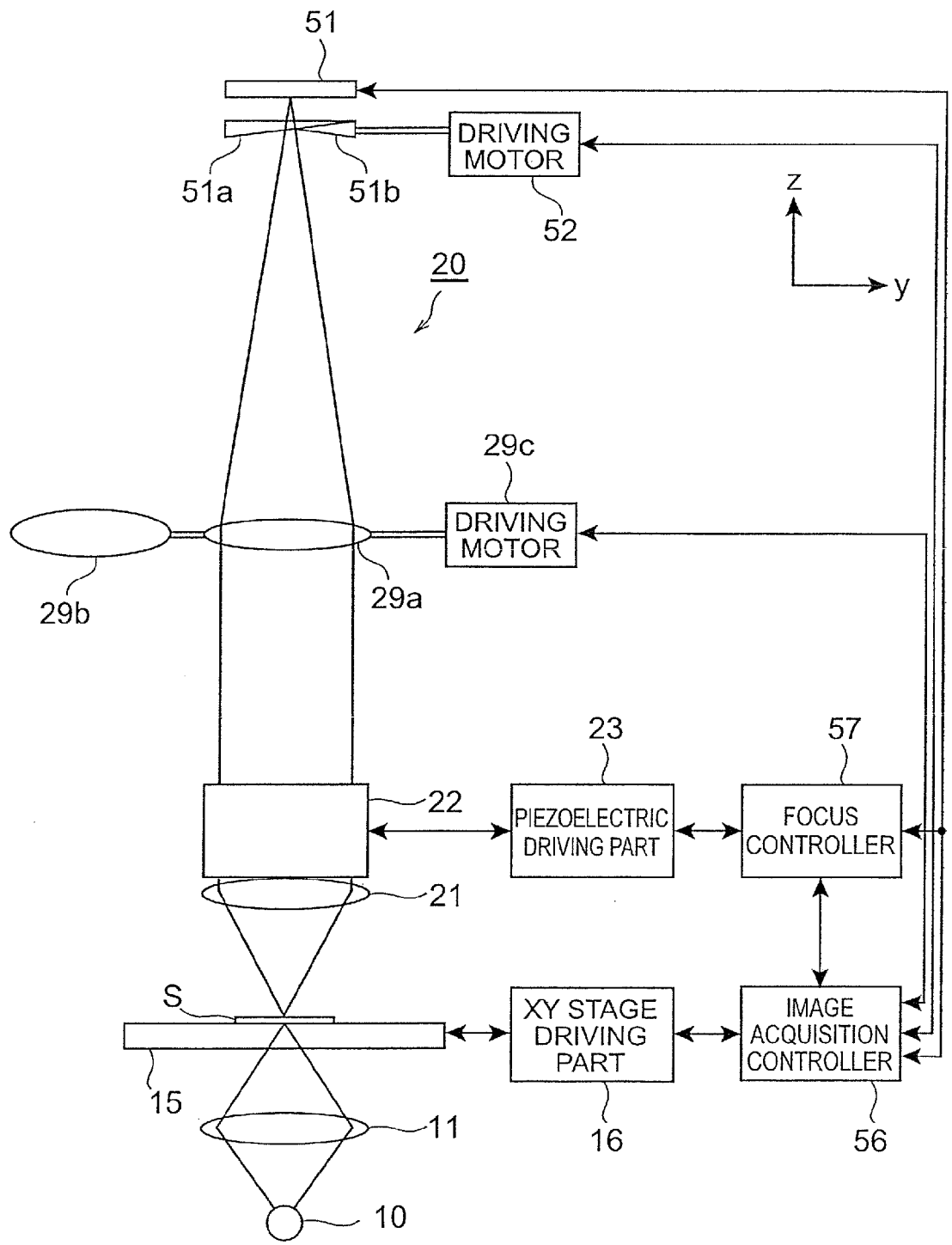
FIG. 19 is a block diagram showing the construction of a forth embodiment of a microscope system.

FIG. 19 is a block diagram showing the construction of a fourth embodiment of the microscope system of the present invention. In this embodiment, the irradiation light source 10, the light converging lens 11, the sample stage 15, the XY stage driving part 16, the piezoelectric actuator 22, the piezoelectric driving part 23, the CCD camera 51, the optical path length changing members 51a and 51b, the driving motor 52, the image acquisition controller 56 and the focus controller 57 are the same as the construction shown in FIG. 17.

The light guiding optical system 20 is equipped at the upper side of the sample stage 15 with respect to the sample S. In this embodiment, the light guiding optical system 20 has an objective lens 21 and image forming lenses 29a and 29b disposed at the rear stage of the objective lens 21. The image forming lenses 29a and 29b are joined to each other in the direction vertical to the optical axis, and the lenses on the optical path can be switched by a driving motor 29c. The driving of the lenses 29a and 29b by the driving motor 29c is controlled by the image acquisition controller 56.

Here, variation in the optical axis direction on the sample S is equal to the square of a magnification on the image pickup face. Therefore, when an image forming lens required to acquire an image has a high magnification, the optical path length changing member required for the focus measurement is thick at the wedge part thereof, so that a problem in manufacturing or a total reflection problem in the changing member may occur. On the other hand, by using the construction where the image forming lenses 29a and 29b different in magnification as described above can be switched to each other and selectively using the lens having a lower magnification in the focus measuring operation, the focus measurement can be suitably performed without being influenced by the magnification in the image acquiring operation.

Figure 20:
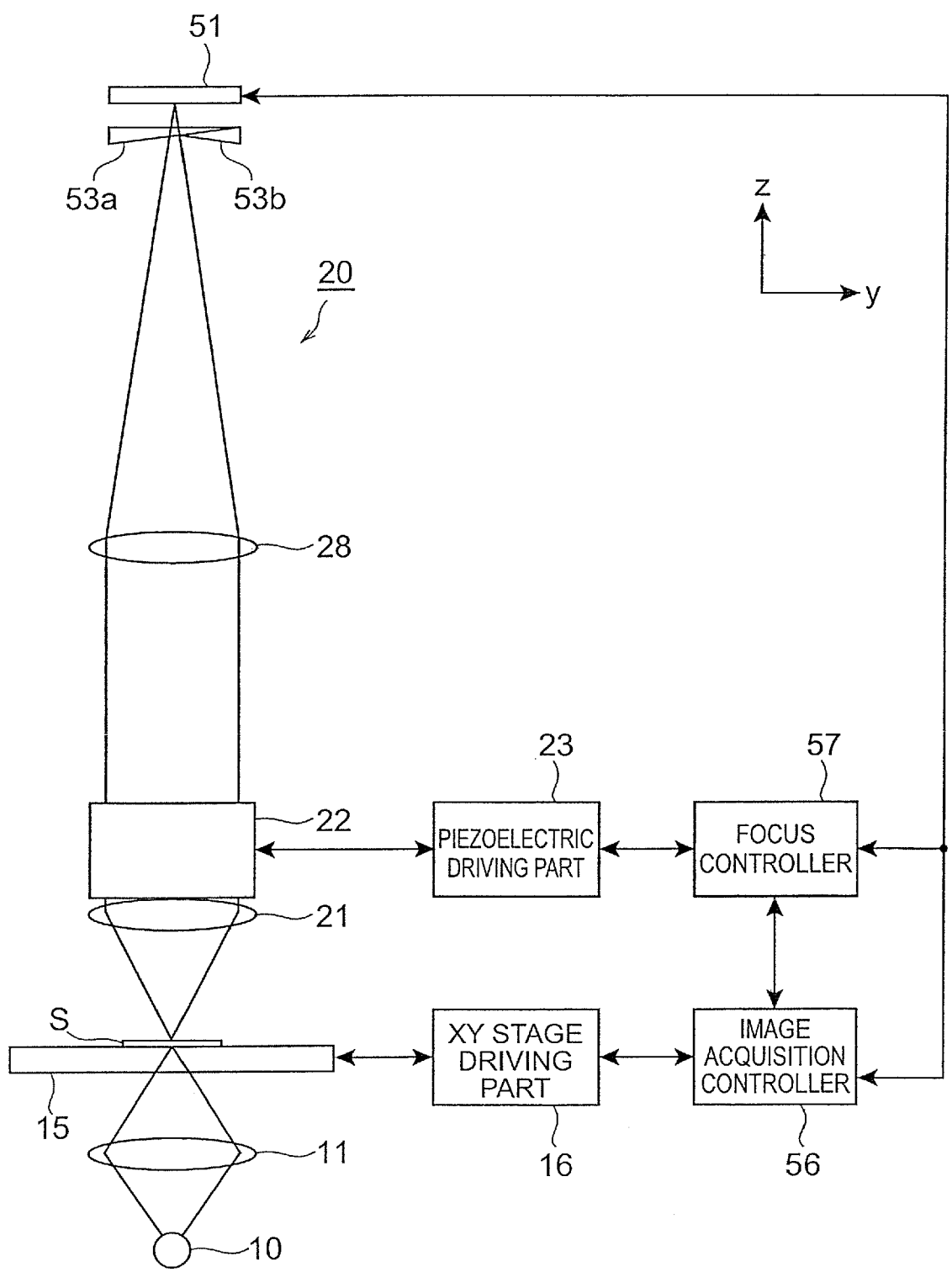
FIG. 20 is a block diagram showing the construction of a fifth embodiment of a microscope system.

FIG. 20 is a block diagram showing the construction of a fifth embodiment of the microscope system according to the present invention. In this embodiment, the irradiation light source 10, the light converging lens 11, the sample stage 15, the XY stage driving part 16, the light guiding optical system 20, the piezoelectric actuator 22, the piezoelectric driving part 23, the CCD camera 51, the image acquisition controller 56 and the focus controller 57 are the same as the construction shown in FIG. 17.

In this embodiment, with respect to the CCD camera 51, the two image pickup areas of the image acquisition area used for the image acquisition and the focus measurement area used for the focus measurement are set on the image pickup face with respect to the x-axis direction. Furthermore, in the focus measurement area of the above two image pickup areas, two image pickup areas of a first image pickup area and a second image pickup area are further set with respect to the x-axis direction. Optical path length changing members 53a and 53b which are the same as the optical path length changing members 51a and 51b shown in FIG. 17 are equipped to the first and second image pickup areas of the focus measurement area.

In the above construction, the image acquisition area of the CCD camera 51 functions as the image acquisition image pickup means. The focus measurement area in which the optical path length changing members 53a and 53b are equipped functions as the focus control image pickup means. In the construction as described above, the driving motor for driving the optical path length changing members 53a and 53b is unnecessary. Furthermore, by using the image acquisition area and the focus measurement area of the camera 51, the image acquisition of the sample S and the focus control of the image pickup can be simultaneously performed.

Figure 21:
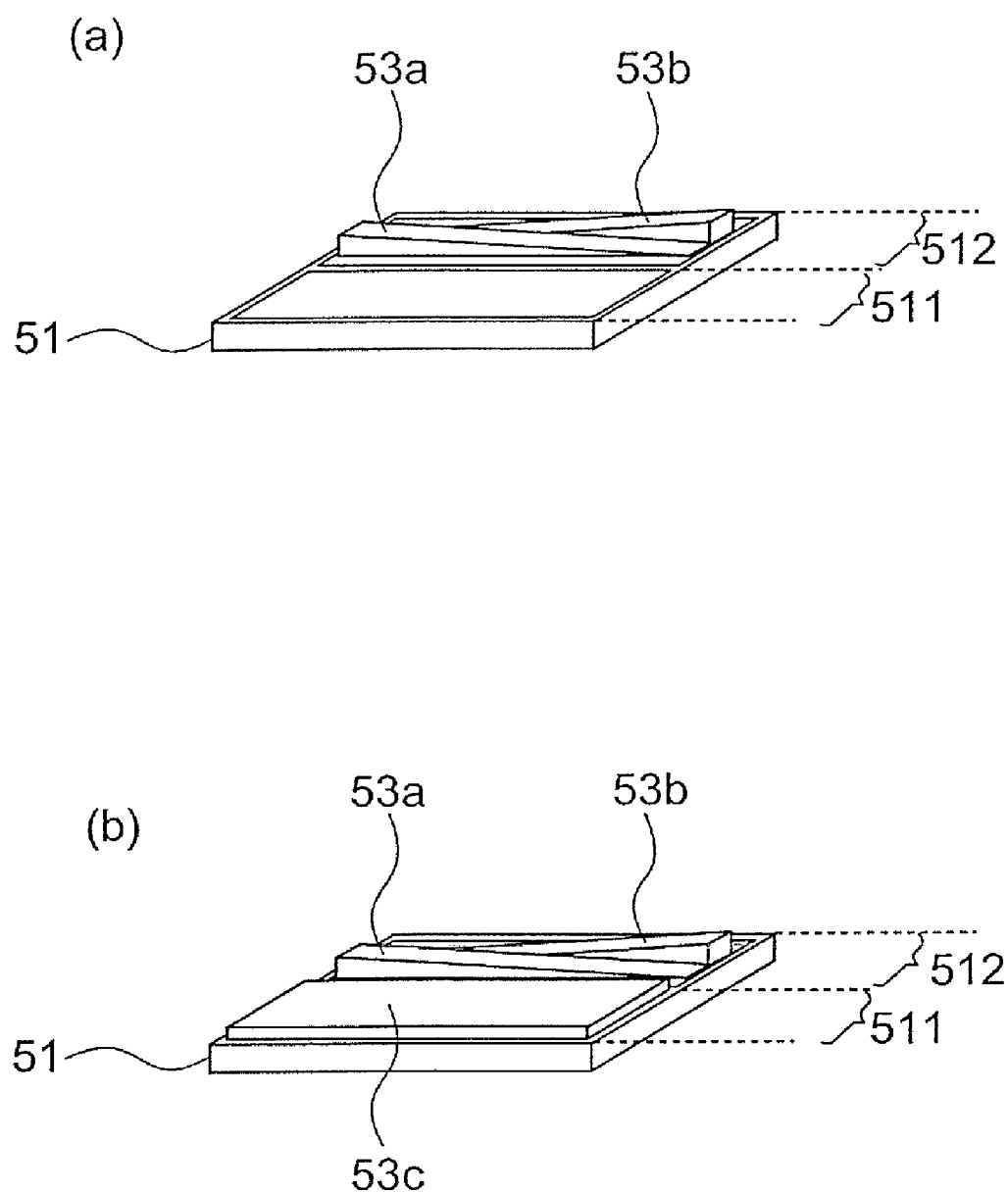
FIG. 21 is a figure including perspective views showing examples of the construction of an image pickup device and an optical path length changing member.

FIG. 21 is a figure showing examples of the construction of the CCD camera and the optical path length changing member. In the construction shown by a construction example (a) of FIG. 21, the wedge shape optical path length changing members 53a and 53b are disposed in a focus measurement area 512 of an image acquisition area 511 and the focus measurement area 512 of the camera 51.

In the construction shown by a construction example (b) of FIG. 21, the wedge shape optical path length changing members 53a and 53b are disposed in the focus measurement area 512 of the image acquisition area 511 and the focus measurement area 512 of the camera 51. Furthermore, a plate shape glass member 53c for adjusting the optical path length is disposed in the image acquisition area 511. In the construction example (a) of FIG. 21, it is necessary to correct the optical path length in the image acquisition by the increment of the optical path length (optical distance) due to the thickness at the center positions of the optical path length changing members 53a and 53b. On the other hand, in the construction example (b), this correction is unnecessary because the optical path length adjusting member 53c is equipped.

Figure 22:
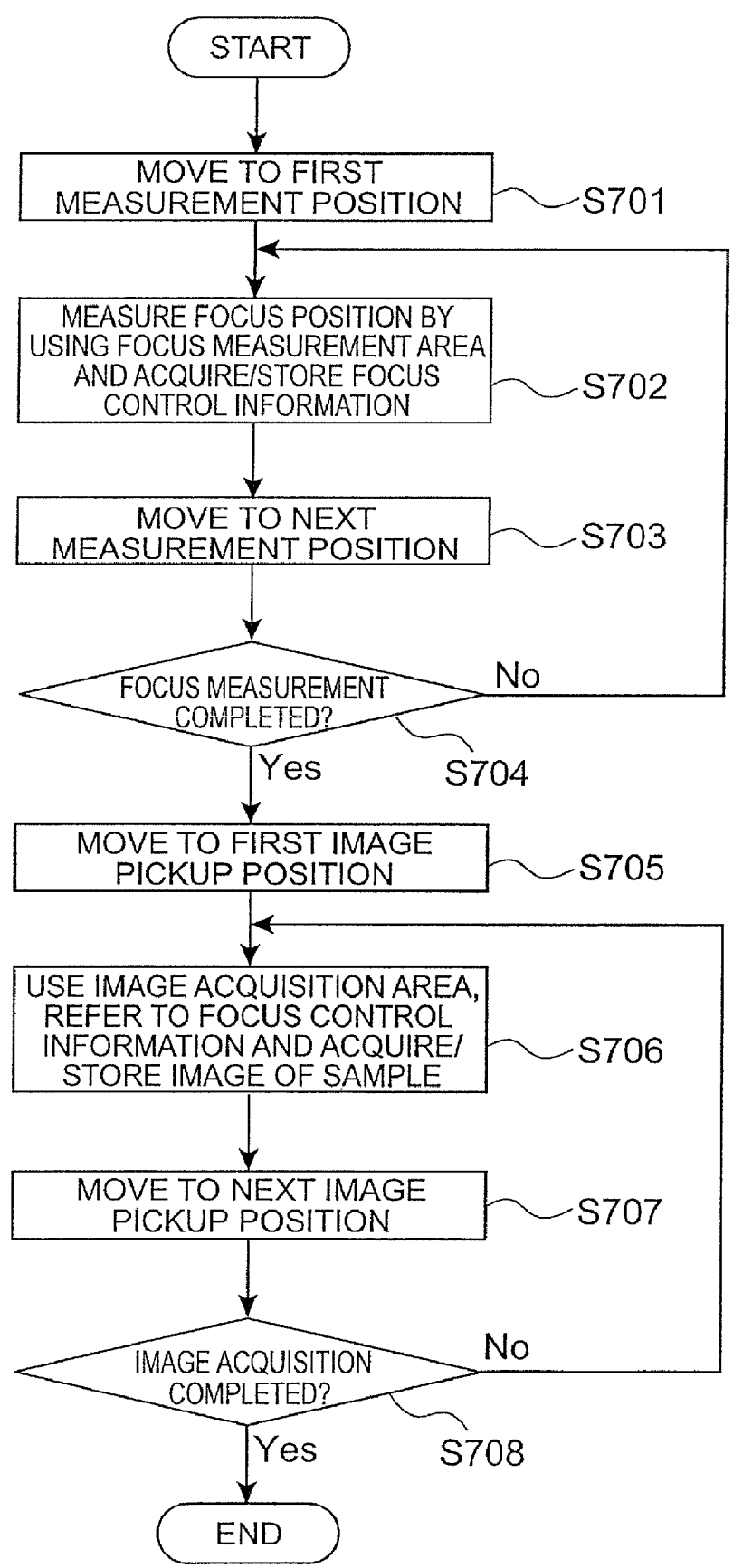
FIG. 22 is a flowchart showing an example of a focus control method.

A focus control method of the microscope system shown in FIG. 20 will be described. FIG. 22 is a flowchart showing an example of the focus control method. In this case, a control method when the image acquisition of the sample and the focus control of the image pickup are separately carried out will be described.

First, the sample stage 15 is driven by the XY stage driving part 16, and the sample S is moved so that the measurement position on the optical axis of the microscope optical system including the irradiation light source 10 and the objective lens 21 is set to a first measurement position (step S701).

Subsequently, for the measurement position thus set, an image acquired by using the focus measurement area of the camera 51 with the optical path length changing members 53a and 53b is analyzed to measure the focus position, and the focus control information thus acquired is stored (S702). When the focus control information acquisition is finished, the sample S is moved so that the measurement position on the optical axis is set to a next measurement position (S703). It is judged for all the measurement positions whether the focus measurement has been completed (S704). If it has not yet been completed, the steps S702 and S703 of the focus measurement are repeated. On the other hand, if the focus measurement has been completed, the focus measuring work is finished.

Subsequently, the sample stage 15 is driven by the XY stage driving part 16 to move the sample S so that the measurement position on the optical axis is set to a first image pickup position (S705).

Subsequently, focus control is carried out on the set image pickup position by referring to the focus control information acquired previously, and also an image of the sample S is acquired and stored by using the image acquisition area of the camera 51 (S706). After the image acquisition is finished, the sample S is moved so that the image pickup position on the optical axis is set to a next image pickup position (S707). It is judged for all the image pickup positions whether the image acquisition of the sample S has been completed (S708). If it has not yet been completed, the steps S706 and S707 of the image acquisition are repeated. On the other hand, if the image acquisition has been completed, the image acquiring work is finished.

Figure 23:
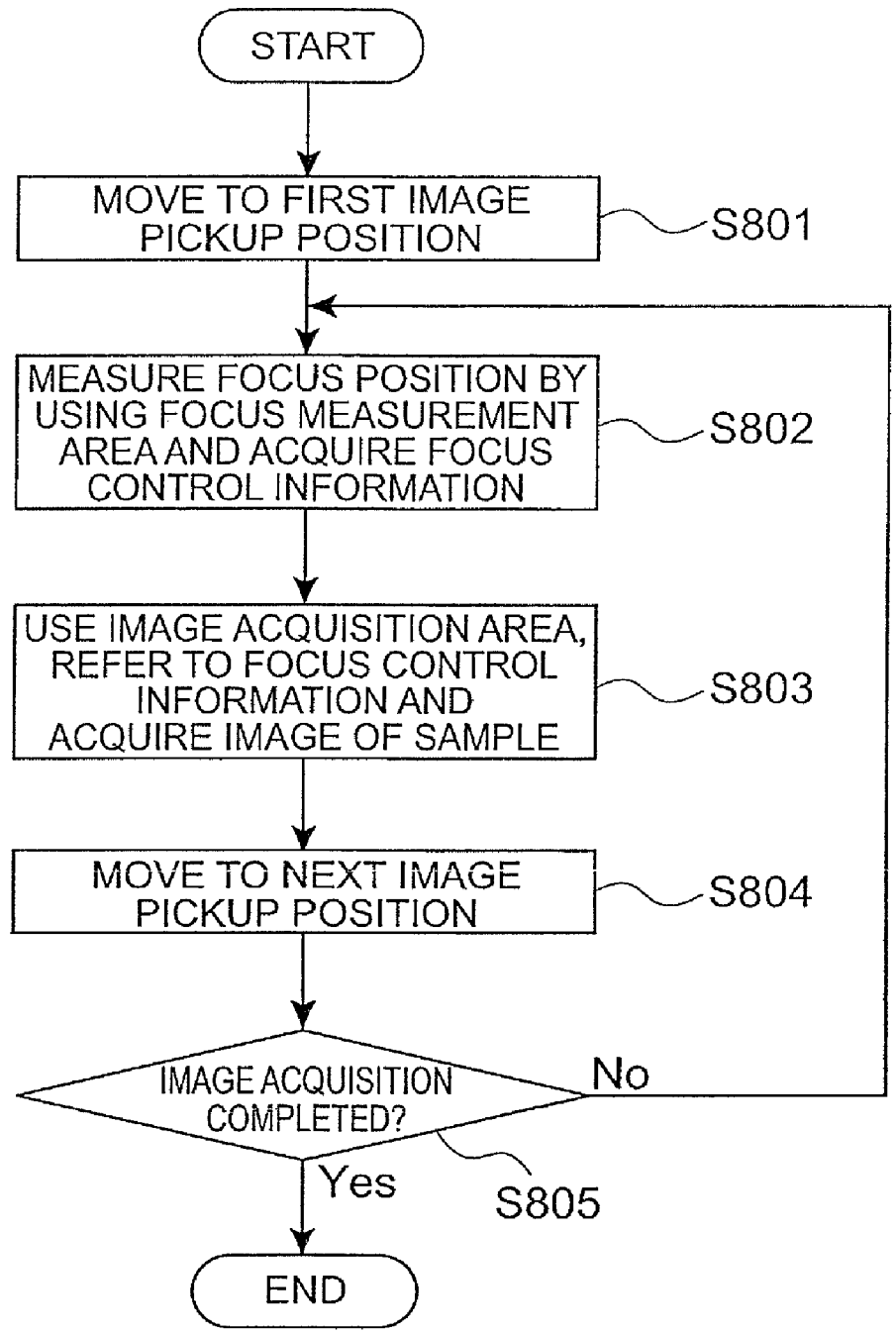
FIG. 23 is a flowchart showing another example of the focus control method.

FIG. 23 is a flowchart showing another example of the focus control method. In this case, control method when the image acquisition of the sample and the focus control of the image pickup are simultaneously carried out will be described.

First, the sample stage 15 is driven by the XY stage driving part 16, and the sample S is moved so that the image pickup position on the optical axis of the microscope optical system including the irradiation light source 10 and the objective lens 21 is set to a first image pickup position (step S801). In this example, in order to perform both the image acquisition and the focus control at the same time, the image pickup position corresponds to the measurement position of the focus measurement.

Subsequently, with respect to the set image pickup position, an image acquired by using the focus measurement area of the camera 51 with the optical path length changing members 53a and 53b is analyzed to measure the focus position, thereby acquiring focus control information (S802). Furthermore, focus control is carried out by referring to the focus control information thus acquired, and an image of the sample S is acquired by using the image acquisition area of the camera 51 (S803). After the image acquisition is finished, the sample S is moved so that the image pickup position on the optical axis is set to a next image pickup position (S804). It is judged for all the image pickup positions whether the image acquisition of the sample S has been completed (S805). If it has not yet been completed, the steps S802 to S804 for the image acquisition are repeated. If the image acquisition has been completed, the image acquiring work is finished.

According to the focus control method as described above, in the microscope system shown in FIG. 20, the image acquisition of the sample S and the focus control of the image pickup can be suitably performed. Furthermore, according to the above construction, the image acquisition and the focus control can be separately or simultaneously performed as described above.

The microscope system of the present invention is not limited to the constructions of the above embodiments, and various modifications may be made. For example, in the above embodiments, the microscope system is designed as a transmission type microscope, however, the same focus control can also be performed in the case of a reflection type microscope or a fluorescence microscope.

Figure 24:
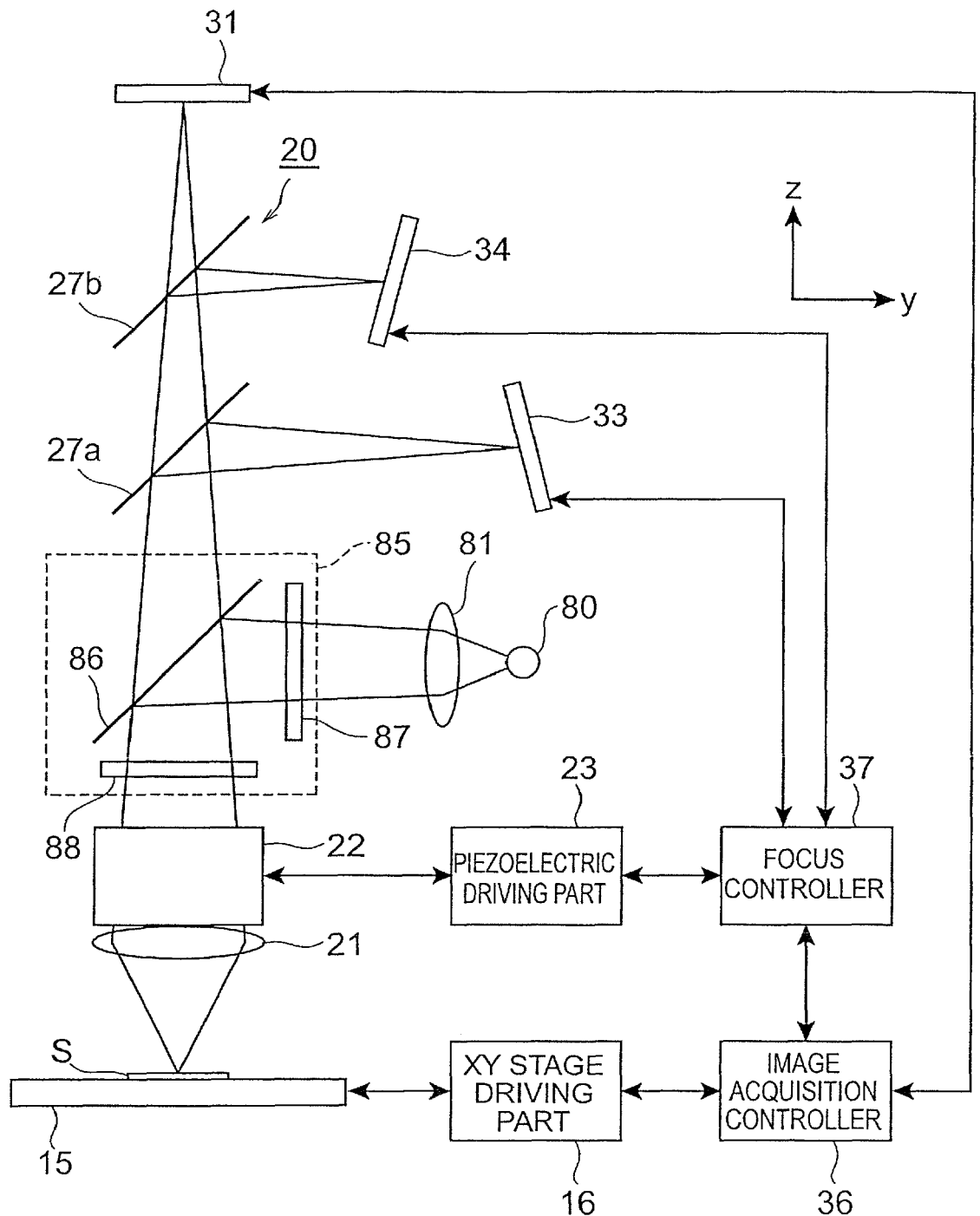
FIG. 24 is a block diagram showing the construction of a sixth embodiment of a microscope system.

FIG. 24 is a block diagram showing the construction of a sixth embodiment of the microscope system according to the present invention. The microscope system of this embodiment is a modification of the microscope system shown in FIG. 1. Specifically, as compared with the transmission type construction shown in FIG. 1 in which the irradiation light source 10 and the light converging lens 11 are disposed below the sample stage 15, the microscope system shown in FIG. 24 is designed as a fluorescence microscope in which an irradiation light source 80, a lens 81 and an irradiation optical system 85 are disposed in place of the irradiation light source 10 and the light converging lens 11.

That is, in FIG. 24, a dichroic mirror 86 is disposed between the upstream beam splitter 27a and the objective lens 21 in the light guiding optical system 20. The dichroic mirror 86 reflects light made incident from the irradiation light source 80 through the lens 81 and irradiates the light to the sample S as exciting light, and also allows fluorescence light occurring in the sample S to pass through the beam splitter 27a. Furthermore, an excitation filter 87 and a cut filter 88 are disposed between the dichroic mirror 86 and the irradiation light source 80 and between the dichroic mirror 86 and the objective lens 21, and an irradiation optical system 85 (Fluorescence filter cube) is constructed by the dichroic mirror 86, the excitation filter 87 and the cut filter 88.

In the fluorescence microscope thus constructed, focus control can be also performed as in the case of the transmission type microscope. Furthermore, when the microscope is designed to have a reflection type construction, the construction of FIG. 24 may be modified so that the dichroic mirror 86 is replaced by a half mirror, and the filters 87 and 88 are removed.

Here, as mentioned above, the construction where the optical path length varies by disposing the optical path length changing member at the front side of the image pickup device may be applied to construction where the two types of optical path length changing members whose thickness variation directions are opposite each other as shown in a construction example (d) of FIG. 16 are equipped to one image pickup device. In this case, a first optical path length changing member whose optical path length varies along a predetermined variation direction is disposed in a first image pickup area of the image pickup face of the image pickup device, and a second optical path length changing member whose optical path length varies along the above variation direction and at a different variation rates, preferably in the opposite direction may be disposed in a second image pickup area of the image pickup face.

In this construction, in general, an optical image incident to the second image pickup area is different from an optical image incident to the first image pickup area. For this point, it is preferable to use a splitting optical system for splitting the optical image for acquiring the image used for focus control into a first optical path to the first optical path length changing member and the first image pickup area of the image pickup face of the image pickup device, and a second optical path to the second optical path length changing member and the second image pickup area of the image pickup face of the image pickup device.

Figure 25:
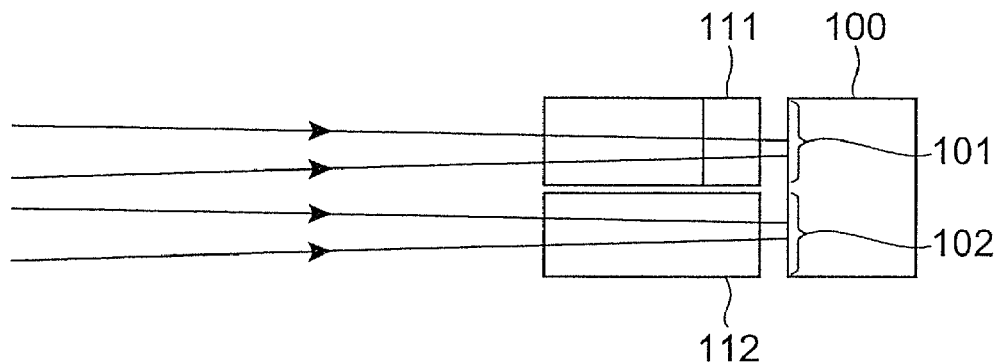
FIG. 25 is a diagram showing the construction of a splitting optical system for the image pickup device for focus control.
Figure 25:
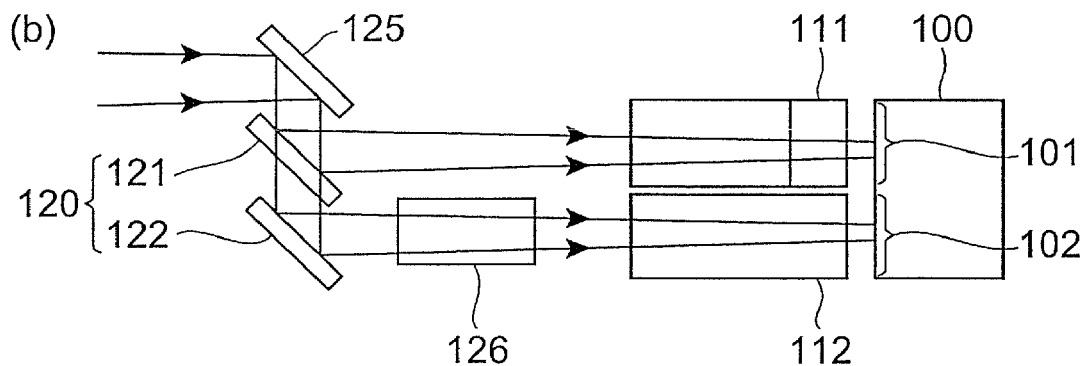
Figure 25:
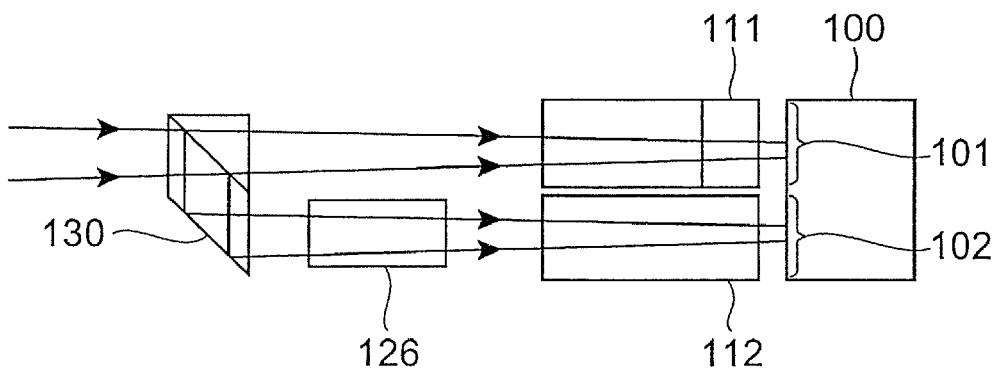

FIG. 25 is a diagram showing the construction of the splitting optical system for the image pickup device for focus control. In the construction (a) of FIG. 25, the first optical path length changing member 111 is disposed for the first image pickup area 101 of the image pickup device 100 for acquiring the image for focus control, and the second optical path length changing member 112, whose optical path length varies in the opposite direction to the first optical path length changing member 111, is disposed for the second image pickup area 102. In this case, as mentioned above, the optical image incident to the second image pickup area 102 is different from the optical image incident to the first image pickup area 101 of the image pickup device 100.

On the other hand, in the construction (b) of FIG. 25, the splitting optical system 120 having a 50% reflection mirror 121 for reflecting the optical image to the first image pickup area 101 and a 100% reflection mirror 122 for reflecting the optical image to the second image pickup area 102 is equipped. In this construction, the same optical image split by the splitting optical system 120 is incident to the image pickup areas 101, 102, respectively, and thus the precision of focus control can be enhanced.

Here, in the construction (b), a 100% reflection mirror 125 is disposed at the front stage of the splitting optical system 120. By using the reflection mirror 125, the range of the optical image incident to the image pickup device 100 can be restricted, and thereby the overlap of the optical images between the image pickup areas 101, 102 can be prevented. However, this reflection mirror 125 may be excluded if not necessary. In addition, in the above construction (b), the optical path length adjusting member 126 for correcting the optical path length is disposed between the reflection mirror 122 and the second image pickup area 102. As for the splitting optical system, an optical splitting prism 130 shown in the construction (c) in FIG. 25 or the like can be also used.

Furthermore, in the above construction, for the sums $T_1$ and $T_2$ calculated from the two measurement target images $X_1'$ and $X_2'$ acquired by the image pickup areas 101 and 102, it is preferable to replace the sum $T_1$ by $T_1 \times$(average value of $X_2'$/average value of $X_1'$) for correcting the difference in brightness (see the flowchart in FIG. 5).

The microscope system of the present invention is usable as a microscope system which can suitably perform focus control when an image of a sample is acquired. That is, according to the microscope system of the present invention, provided is a focus control image pickup means having first image pickup means and second image pickup means which can acquire two-dimensional images and designed so that the optical path lengths thereof vary along a predetermined variation direction at different variation rates, and the focus control information when images of the sample are acquired is acquired with high precision by carrying out the focus measurement with two kinds of images acquired by the above image pickup means, so that the focus control can be suitably performed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A microscope system used for acquiring an image of a sample comprising:
    a first image pickup device configured to acquire an image of the sample;
    a second image pickup device configured to acquire an image of the sample for calculating focus control information, the second image pickup device having a focus measurement area;
    an optical path length changing member disposed adjacent the focus measurement area of the second image pickup device;
    a focus controller;
    an objective lens; and
    a driving device controllable by the focus controller and configured to drive the objective lens for adjusting a focal point;
    wherein the focus measurement area of the second image pickup device includes a first image pickup area and a second image pickup area,
    the focus controller is configured to analyze the images received by the first image pickup area and the second image pickup area of the second image pickup device and to acquire the focus control information,
    the focus controller is configured to adjust the focal point by driving the objective lens using the driving device on the basis of the focus control information, and
    the first image pickup device is configured to acquire an image of the sample.

2. A microscope system according to claim 1, wherein the focus controller is configured to calculate a difference value of the images received by the first image pickup area and the second image pickup area of the second image pickup device and to acquire the focus control information on the basis of the difference value.

3. A microscope system according to claim 1, wherein the image acquisition of the sample by the first image pickup device and focus control of the first image pickup device are simultaneously carried out.

4. A microscope system according to claim 1, wherein (a) the focus controller analyzes the images received by the second image pickup device and acquires focus control information for a first pickup location, (b) the focus controller adjusts a focal point on the basis of the focus control information for the first pickup location, and (c) the first image pickup device performs image acquisition of the sample for the first image pickup location, and, thereafter, steps (a) through (c) are performed for multiple additional pickup locations, until image acquisition for the entire sample has been carried out.

5. A microscope system according to claim 1, wherein the second image pickup device is disposed at a position corresponding to an image forming plane of an optical image of the sample.

6. A microscope system according to claim 1, wherein the microscope system comprises a slide scanner system used for the image acquisition.

* * * * *